(12) United States Patent
Stav et al.

(10) Patent No.: US 11,509,042 B2
(45) Date of Patent: Nov. 22, 2022

(54) RADOME FOR AUTOMOTIVE RADAR PATCH ANTENNA

(71) Applicant: Arbe Robotics Ltd., Tel Aviv (IL)

(72) Inventors: Assaf Stav, Givatayim (IL); Abraham Bauer, Hod Hasharon (IL)

(73) Assignee: Arbe Robotics Ltd.

( * ) Notice: Subject to any disclaimer, the term of this patent is extended or adjusted under 35 U.S.C. 154(b) by 47 days.

(21) Appl. No.: 17/114,853

(22) Filed: Dec. 8, 2020

(65) Prior Publication Data

US 2021/0184340 A1 Jun. 17, 2021

(30) Foreign Application Priority Data

Dec. 9, 2019 (IL) .......................................... 271269

(51) Int. Cl.
*H01Q 1/32* (2006.01)
*H01Q 1/42* (2006.01)
(Continued)

(52) U.S. Cl.
CPC ........... *H01Q 1/3233* (2013.01); *G01S 13/34* (2013.01); *G01S 13/931* (2013.01); *H01Q 1/42* (2013.01); *H01Q 21/065* (2013.01)

(58) Field of Classification Search
CPC ...... H01Q 1/12; H01Q 1/1207; H01Q 1/1214; H01Q 1/27; H01Q 1/32; H01Q 1/3233;
(Continued)

(56) References Cited

U.S. PATENT DOCUMENTS 3,603,989 A 9/1971 Caspers
3,981,012 A 9/1976 Brault
(Continued)

FOREIGN PATENT DOCUMENTS

CN 1967286 A 5/2007
CN 101950851 A 1/2011
(Continued)

OTHER PUBLICATIONS

Jason Yu et al.: "Multiband chirp synthesis for frequency-hopped FMCW radar", Signals, Systems and Computers, 2009 Conference Record of the Forty-Third Asilomar Conference on, IEEE, Piscataway, NJ, USA, Nov. 1, 2009 (Nov. 1, 2009), pp. 1315-1319, XP031679466, ISBN: 978-1-4244-5825-7.
(Continued)

*Primary Examiner* — Jason Crawford
(74) *Attorney, Agent, or Firm* — Zaretsky Group PC; Howard Zaretsky

(57) ABSTRACT

A novel and useful radome suitable for use in an automotive radar system that employs patch antenna arrays. In one embodiment, the radome is a 'U' shaped half cylinder for patch antenna arrays such as on a printed circuit board (PCB). The patch antennas may or may not be situated in the same plane. Each array has its own half cylinder associated with it. Each array may have a different antenna pattern with different gain and side lobes. In this case, each patch antenna array has its own radome configured appropriately. Alternatively, the radome comprises a half sphere shape (or bubble shape) whereby each antenna port has its own individual half sphere shaped radome. This functions to improve the performance of the radome by increasing the number of curved dimensions from one to two.

15 Claims, 21 Drawing Sheets

(51) Int. Cl.
*H01Q 21/06* (2006.01)
*G01S 13/931* (2020.01)
*G01S 13/34* (2006.01)

(58) Field of Classification Search
CPC ........ H01Q 1/3275; H01Q 1/40; H01Q 1/405; H01Q 1/72; H01Q 21/06; H01Q 21/061; H01Q 21/065; G01S 13/88; G01S 13/93; G01S 13/931
See application file for complete search history.

(56) References Cited

U.S. PATENT DOCUMENTS

| | | |
|---|---|---|
| 4,166,980 A | 9/1979 | Apostolos |
| 4,197,540 A | 4/1980 | Riggs |
| 4,494,083 A | 1/1985 | Josefsson |
| 4,926,185 A | 5/1990 | Wittenberg |
| 5,063,603 A | 11/1991 | Burt |
| 5,424,742 A | 6/1995 | Long |
| 5,430,445 A | 7/1995 | Peregrim |
| 5,442,362 A | 8/1995 | Zwarts |
| 5,923,280 A | 7/1999 | Farmer |
| 5,955,992 A | 9/1999 | Shattil |
| 6,028,548 A | 2/2000 | Farmer |
| 6,828,929 B2 | 12/2004 | Barbella |
| 6,865,216 B1 | 3/2005 | Beamish |
| 6,888,887 B1 | 5/2005 | Shattil |
| 6,989,782 B2 | 1/2006 | Walker |
| 7,071,868 B2 | 7/2006 | Woodington |
| 7,308,043 B1 | 12/2007 | Frank |
| 7,639,171 B2 | 12/2009 | Alland |
| 7,804,445 B1 | 9/2010 | Fiore |
| 7,835,455 B2 | 11/2010 | Shattil |
| 8,035,038 B2 | 10/2011 | Cheng |
| 8,175,134 B1 | 5/2012 | Giallorenzi |
| 8,599,062 B2 | 12/2013 | Szajnowski |
| 8,803,732 B2 | 8/2014 | Antonik |
| 8,970,425 B2 | 3/2015 | Nogueira-Nine |
| 9,250,322 B2 | 2/2016 | Newman |
| 9,645,228 B1 | 5/2017 | Doerry |
| 9,791,564 B1 | 10/2017 | Harris |
| 10,082,570 B1 | 9/2018 | Izadian |
| 10,094,920 B2 | 10/2018 | Rao |
| 10,359,504 B2 | 7/2019 | Fetterman |
| 10,451,723 B2 | 10/2019 | Chiu |
| 11,199,617 B2 | 12/2021 | Hakobyan |
| 11,277,902 B2* | 3/2022 | Snir ............... H01L 24/16 |
| 11,374,321 B2* | 6/2022 | Ahmadloo .......... H01Q 9/0407 |
| 2003/0151476 A1 | 8/2003 | Salmela |
| 2004/0150552 A1 | 8/2004 | Barbella |
| 2004/0196172 A1 | 10/2004 | Wasiewicz |
| 2005/0062660 A1* | 3/2005 | Henderson ......... H01Q 1/3283 |
| | | 343/754 |
| 2005/0156780 A1 | 7/2005 | Bonthron |
| 2005/0232182 A1 | 10/2005 | Shattil |
| 2007/0040728 A1 | 2/2007 | Nishimura |
| 2007/0171123 A1 | 7/2007 | Nakano |
| 2007/0205847 A1 | 9/2007 | Kushta |
| 2007/0252701 A1* | 11/2007 | Berry ................. H01Q 1/42 |
| | | 343/878 |
| 2008/0284641 A1 | 11/2008 | Spreadbury |
| 2008/0317345 A1 | 12/2008 | Wiedemann |
| 2009/0085800 A1 | 4/2009 | Alland |
| 2011/0122014 A1 | 5/2011 | Szajnowski |
| 2012/0056780 A1 | 3/2012 | Antonik |
| 2012/0146846 A1 | 6/2012 | Antonik |
| 2012/0169523 A1 | 7/2012 | Lee |
| 2012/0235859 A1 | 9/2012 | Hayase |
| 2012/0313810 A1 | 12/2012 | Nogueira-Nine |
| 2013/0009806 A1 | 1/2013 | Newman |
| 2013/0257670 A1 | 10/2013 | Sovero |
| 2014/0022113 A1 | 1/2014 | Nogueira-Nine |
| 2014/0079248 A1 | 3/2014 | Short |
| 2014/0211438 A1 | 7/2014 | Lin |
| 2014/0320231 A1 | 10/2014 | Seler |
| 2014/0355385 A1 | 12/2014 | Inagaki |
| 2015/0061928 A1 | 3/2015 | Cornic |
| 2015/0130671 A1* | 5/2015 | Cordone ............... H01Q 5/30 |
| | | 343/705 |
| 2015/0378006 A1* | 12/2015 | Ishida .............. H01Q 19/021 |
| | | 342/175 |
| 2016/0018511 A1 | 1/2016 | Nayyar |
| 2016/0061942 A1 | 3/2016 | Rao |
| 2016/0084941 A1 | 3/2016 | Arage |
| 2016/0131738 A1 | 5/2016 | Prechtel |
| 2016/0139254 A1 | 5/2016 | Wittenberg |
| 2016/0187477 A1 | 6/2016 | Wang |
| 2016/0285611 A1 | 9/2016 | Fischer |
| 2016/0334502 A1 | 11/2016 | Ali |
| 2016/0377711 A1 | 12/2016 | Arage |
| 2017/0131394 A1 | 5/2017 | Roger |
| 2017/0219689 A1 | 8/2017 | Hung |
| 2017/0307744 A1 | 10/2017 | Loesch |
| 2017/0317407 A1* | 11/2017 | Yasin ................ H01Q 1/3275 |
| 2017/0343648 A1 | 11/2017 | Trotta |
| 2017/0343667 A1* | 11/2017 | Vacanti ............. G01S 13/4472 |
| 2017/0346177 A1* | 11/2017 | Nagata ............... H01Q 21/065 |
| 2017/0352950 A1* | 12/2017 | Sakurai ............. G01S 13/931 |
| 2018/0045819 A1 | 2/2018 | Cornic |
| 2018/0083348 A1* | 3/2018 | Thiam ................. H01Q 5/371 |
| 2018/0095162 A1 | 4/2018 | Fetterman |
| 2018/0172816 A1 | 6/2018 | Chiu |
| 2018/0350751 A1 | 12/2018 | Sun |
| 2019/0004167 A1 | 1/2019 | Rao |
| 2019/0050372 A1 | 2/2019 | Zeng |
| 2019/0235066 A1 | 8/2019 | Iida |
| 2019/0265346 A1 | 8/2019 | Hakobyan |
| 2019/0384318 A1* | 12/2019 | Fuchs ................ G05D 1/0274 |
| 2020/0011968 A1 | 1/2020 | Hammes |
| 2020/0176393 A1 | 6/2020 | Ketterson |
| 2020/0388578 A1 | 12/2020 | Lim |
| 2020/0393536 A1 | 12/2020 | Stettiner |
| 2020/0403307 A1* | 12/2020 | Ahmadloo ............ H01Q 1/42 |
| 2021/0156980 A1 | 5/2021 | Stettiner |
| 2021/0156981 A1 | 5/2021 | Stettiner |
| 2021/0156982 A1 | 5/2021 | Stettiner |
| 2021/0184340 A1* | 6/2021 | Stav .................. G01S 13/931 |
| 2021/0263147 A1 | 8/2021 | Bauer |
| 2021/0275056 A1 | 9/2021 | McMahon |
| 2021/0293923 A1 | 9/2021 | Arkind |
| 2021/0318413 A1 | 10/2021 | Arkind |
| 2021/0320425 A1 | 10/2021 | Arkind |

FOREIGN PATENT DOCUMENTS

| | | |
|---|---|---|
| CN | 106100696 A | 11/2016 |
| CN | 108089163 A | 5/2018 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 3165941 A1 | 5/2017 |
| GB | 2462148 A | 2/2010 |
| WO | 2017/069679 A1 | 4/2017 |
| WO | 2017/208670 A1 | 12/2017 |
| WO | 2018/138725 A1 | 8/2018 |
| WO | 2018/142395 A1 | 8/2018 |
| WO | 2018/142396 A1 | 8/2018 |

OTHER PUBLICATIONS

Laribi Amir et al.: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPCO.2017.8081546 [retrieved on Oct. 23, 2017].

Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).

(56) References Cited

OTHER PUBLICATIONS

Comparative Performance Analysis of Hamming, Hanning and Blackman Window by Prajoy Podder at International Journal of Computer Applications (0975-8887) vol. 96—No. 18, Jun. 2014 (Year: 2014).

* cited by examiner

RADOME FOR AUTOMOTIVE RADAR PATCH ANTENNA

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to an efficient radome for patch antennas.

BACKGROUND OF THE INVENTION

In recent years many industries are moving to autonomous solutions such as the automotive industry, deliveries etc. These autonomous platforms should operate in the environment while interacting with both the stationary and moving objects. For this purpose, these systems require a sensor suite which allows them to sense their surrounding in a reliable and efficient manner. For example, in order for an autonomous car to plan its route on a road with other cars on it, the trajectory planner must have a 3D map of the environment with indication of moving objects.

Visual sensors are also degraded by bad weather and poor visibility due to fog, smoke, sand, storms, etc.). They are also limited in estimating radial velocities. Light Detection And Ranging (LIDAR) devices are used to measure distance to a target by illuminating that target with a laser light. These devices, however, are expensive, have moving parts, and have very limited range. Radar is an augmenting and not a replacing technology.

Due to natural limitations of visual sensors in range accuracy and reliability problems with optical (e.g., laser) technologies, the best solution to generate this 3D map is via a radar technology. This imposes a new set of requirements which modern radars do not comply with.

Generally, the larger the aperture of the receiving antenna, the more radiation is received which results in higher sensitivity, or equivalently, a narrower main lobe. Hence, the receiving antenna can receive weaker signals and provide a relatively accurate indication regarding their direction.

On the other hand, vehicular radars, including automotive imaging radars, require less sensitivity since the range is relatively short and the signals that are reflected from a target are relatively strong. Vehicular radars, however, are not required to detect point targets, such as an aircraft detected by a missile, but do require high accuracy in order to provide an image of the environment information which is used an input to a Simultaneous Localization And Mapping (SLAM) algorithm which detects the location of obstacles such as other cars or pedestrians in close vicinity. A narrow lobe with high accuracy will be able to provide sharper contour lines of the target image. The lobe width is determined solely by the equivalent aperture, normalized to the wavelength of the transmitted radar signal and not by the number of receiving antenna elements within the aperture, which affects the sensitivity, i.e. the ability to detect weak reflected signals, and ambiguity resolution and the side lobes level.

Another critical performance parameter of imaging radars is the side lobe levels of the antenna array. In the event there is a large object such as a wall located in the direction of a side lobe, an attenuated version of the reflections from the object will appear to be in the direction of the main lobe. This may mask reflections that originate from an obstacle, such as a pedestrian, or create a phantom obstacle which may cause the vehicle to stop.

Therefore, in automotive imaging radars, it is critical to reduce side lobes as much as possible. In addition, there is a need for a compact radar switch array antenna having high azimuth and elevation angular resolution and accuracy that provides increased effective aperture, while using a low number of transmit (TX) and receive (RX) elements that meets cost, space, power and reliability requirements.

Recently, applications of radars in the automotive industry have started to emerge. High-end automobiles already have radars that provide parking assistance and lane departure warning to the driver. Currently, there is growing interest in self-driving cars and it is currently considered to be the main driving force in the automotive industry in the coming years.

Self-driving cars offer a new perspective on the application of radar technology in automobiles. Instead of only assisting the driver, automotive radars will be capable of taking an active role in the control of the vehicle. They are thus likely to become a key sensor of the autonomous control system of a vehicle.

Radar is preferred over other alternatives such as sonar or LIDAR as it is less affected by weather conditions and can be made very small to decrease the effect of the deployed sensor on the aerodynamics and appearance of the vehicle. Frequency Modulated Continuous Wave (FMCW) radar is a type of radar that offers several advantages compared to the others. For example, it ensures the range and velocity information of the surrounded objects can be detected simultaneously. This information is important for the control system of the self-driving vehicle to provide safe and collision-free operation.

For shorter range detection, as in automotive radar, FMCW radar is commonly used. Several benefits of FMCW radar in automotive applications include: (1) FMCW modulation is relatively easy to generate, provides large bandwidth, high average power, good short range performance, high accuracy, low cost due to low bandwidth processing and permits very good range resolution and allows the Doppler shift to be used to determine velocity, (2) FMCW radar can operate at short ranges, (3) FMCW sensors can be made small having a single RF transmission source with an oscillator that is also used to downconvert the received signal, (4) since the transmission is continuous, the modest output power of solid state components is sufficient.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles (especially cars) are increasingly equipped with technologies designed to assist the driver in critical situations. Besides cameras and ultrasonic sensors, car manufacturers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in time and frequency domains, even up to frequencies of 500 GHz.

There is also much interest now in using radar in the realm of autonomous vehicles which is expected to become more prevalent in the future. Millimeter wave automotive radar is suitable for use in the prevention of collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object illuminated by the transmitted radar signal.

Advanced driver assistance systems (ADAS) are systems developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/ traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources external to the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest growing segments in automotive electronics, with steadily increasing rates of adoption of industry wide quality standards, in vehicular safety systems ISO 26262, developing technology specific standards, such as IEEE 2020 for image sensor quality and communications protocols such as the Vehicle Information API.

In recent years many industries are moving to autonomous solutions such as the automotive industry, deliveries, etc. These autonomous platforms operate in the environment while interacting with both stationary and moving objects. For this purpose, these systems require a sensor suite which allows them to sense their surroundings in a reliable and efficient manner. For example, in order for an autonomous vehicle to plan its route on a road with other vehicles on it, the trajectory planner must have a 3D map of the environment with an indication of the moving objects.

Visual sensors are also degraded by bad weather and poor visibility (e.g., fog, smoke, sand, rain storms, snow storms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio.

A well-known way to reduce the number of antenna elements in an array is by using a MIMO technique known as 'virtual array', where separable (e.g., orthogonal) waveforms are transmitted from different antennas (usually simultaneously), and by means of digital processing a larger effective array is generated. The shape of this 'virtual array' is the special convolution of the transmission and reception antennas' positions.

It is also known that by means of bandpass sampling, the de-ramped signal can be sampled with lower A/D frequencies, while preserving the range information of the targets with the ranges matching the designed bandpass filter.

Achieving a high resolution simultaneously in the angular, range and doppler dimensions is a significant challenge due to (inter alia) a linear increment in hardware complexity resolution.

In addition, direction of arrival (DOA) estimation is a key component in any radar system. For imaging radars, this is typically performed digitally, and is usually referred to as digital beam forming (DBF). Prior art methods that fall into this category include linear operations that can be implemented as a matrix multiplication. Other nonlinear methods are usually referred to as super resolution techniques. These techniques, however, require significantly higher computational power and are thus not practical in a low cost consumer sensor.

Radomes are in wide spread use today. A radome is a structural, weatherproof enclosure that protects a radar antenna. Ideally, the radome is constructed of material that minimally attenuates the electromagnetic signal transmitted or received by the antenna, effectively transparent to radio waves. Radomes protect the antenna from weather and conceal antenna electronic equipment from view. They also protect nearby personnel from being accidentally struck by quickly rotating antennas.

There is thus a need for a radome suitable for use with an automotive radar that is relatively low cost and does not substantially reduce the performance of the radar system.

SUMMARY OF THE INVENTION

The present invention a radome suitable for use in an automotive radar system that employs patch antenna arrays. In one embodiment, the radome is a 'U' shaped half cylinder for patch antenna arrays such as on a printed circuit board (PCB). The patch antennas printed on a PCB may or may not be situated in the same plane. Each TX and RX array has its own half cylinder associated with it. Each array may have a different antenna pattern with different gain and side lobes. In this case, each patch antenna array has its own radome configured appropriately, i.e. each radome has a different half cylinder radius above its respective array.

In one embodiment, separate TX and RX antennas each radiate in a different pattern and has different gain and side lobes. A different radome is thus required for each antenna. Each radome is a half cylinder with certain width, radius, and height.

Alternatively, the radome comprises a half sphere shape (or bubble shape) whereby each antenna port has its own individual half sphere shaped radome. This functions to improve the performance of the radome by increasing the number of curved dimensions from one to two.

The half cylinder and half sphere equalizes the phase delay for the electromagnetic waves that radiate from the antenna until they cross the radome. Due to the geometry of the radome, the spherical shape of the radiated wave intersects with the face of the radome in a perpendicular angle which minimizes perturbations to the radiation pattern.

One application of the radome of the present invention is which millimeter wave wireless communication systems and in particular, automotive radar systems. A vehicle or automotive radar is typically mounted on an outer surface of target vehicle and functions to detect and track distance, speed, and angle of targets. Typically frequency modulated continuous wave (FMCW) radar is implemented using the 77-81 GHz band. Typically, the radar system employs transmit and receive patch antenna arrays configured to illuminate as wide a field of view as possible.

The radome functions to physically protect the sensitive patch antenna arrays and electronic components installed within a housing mounted to or in the vehicle. The radome is designed to protect against the external environment while minimizing the loss and distortion of RF energy transmitted from the transmit antennas through the radome or to the receive antennas through the radome.

The radome of the present invention can be used with radars having relatively wide fields of view, such as 100 degrees or more.

There is thus provided in accordance with the invention, a radome for use with an automotive radar antenna, comprising a cover configured to cover a printed circuit board (PCB) on which a plurality of radiating element arrays are formed, including at least one transmit radiating element array and at least one receive radiating element array, the cover comprising a first substantially hallow half cylinder portion located over the at least one transmit radiating element array, and the cover comprising a second substantially hallow half cylinder portion located over the at least one receive radiating element array.

There is also provided in accordance with the invention, an automotive vehicle radar antenna, comprising a housing mountable on an automotive vehicle and having an interior, the housing configured to secure within the interior a printed circuit board (PCB) on which a plurality of radiating element arrays are formed, including at least one transmit radiating element array and at least one receive radiating element array, a radome configured to cover and enclose the PCB, the cover comprising a first substantially hallow half cylinder portion located over the at least one transmit radiating element array, and the cover comprising a second substantially hallow half cylinder portion located over the at least one receive radiating element array.

There is further provided in accordance with the invention, a radome for use with an automotive radar antenna, comprising a cover configured to cover a printed circuit board (PCB) on which a plurality of radiating element arrays are formed, including at least one transmit radiating element array and at least one receive radiating element array, the cover comprising a first plurality of substantially spherical domes, each first substantially spherical dome located over a radiating element of the at least one transmit radiating element array, and the cover comprising a second first plurality of substantially spherical domes, each second substantially spherical dome located over a radiating element of the at least one receive radiating element array.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION

Figure 1:
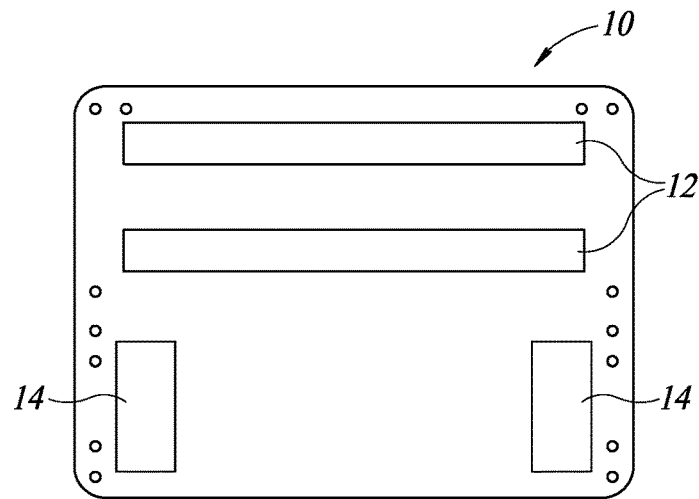
FIG. 1 is a diagram illustrating an example printed circuit board (PCB) having multiple patch antennas.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

A diagram illustrating an example printed circuit board (PCB) having multiple patch antennas is shown in FIG. 1. The example PCB, generally referenced 10, comprises one or more patch antennas 12, 14. In this illustrative example, four groups of patch antenna arrays are shown. The two upper horizontal patch antenna arrays 12 are receive antennas and the two lower vertical patch antenna arrays 14 on the left and right sides are transmit antennas. Note that the PCB may comprise any number of transmit and receive patch antennas.

Figure 2:
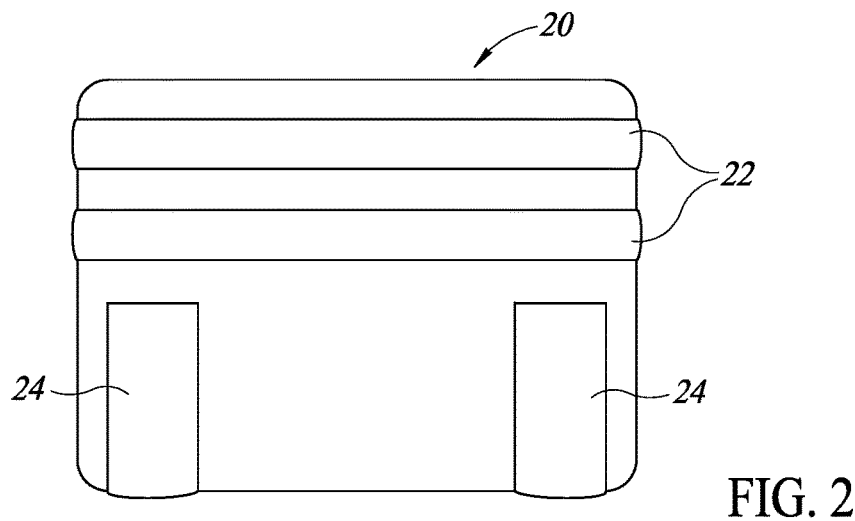
FIG. 2 is a diagram illustrating a top view of an example radome for patch antenna arrays.

A diagram illustrating a top view of an example radome for patch antenna arrays is shown in FIG. 2. The example radome, generally referenced 20, is substantially flat with raised horizontal portions 22 and raised vertical portions 24 that protrude upwards from the flat surface of the radome. The horizontal projections 22 are configured to lie over the receive antennas 12 on the PCB and the vertical projections 24 are configured to lie over the transmit antennas 14. Note that the term radome as used here typically refers to the half cylinder raised portions. In the case of multiple patch antennas, several 'radomes' are employed where they are connected by flat portions. In the example shown, there are four radome portions 'connected' or 'joined' by a relatively large flat portion. Note also that occasionally, the term radome is used to refer to the entire assembly consisting of the raised portions that lie over the patch antenna arrays and the flat connecting portion as well.

Figure 3:
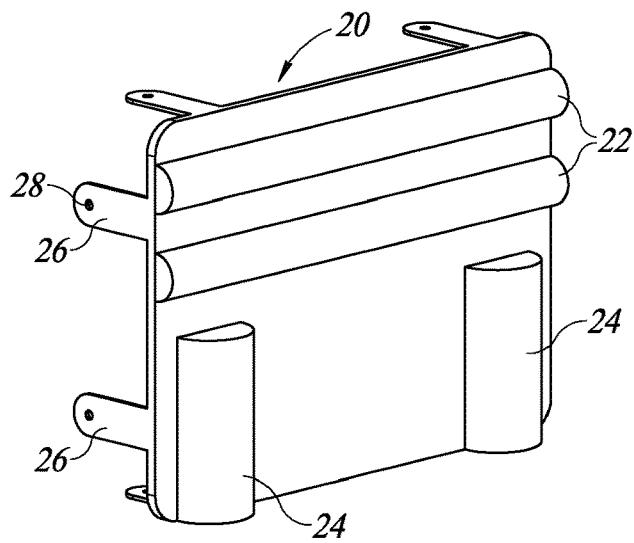
FIG. 3 is a diagram illustrating a first perspective view of an example radome for patch antenna arrays.

A diagram illustrating a first perspective view an example radome for patch antenna arrays is shown in FIG. 3. In one embodiment, the raised receive portion 22 of the radome 20 comprises a hallowed out half cylinder shape. Similarly, the raised transmit portion 24 of the radome 20 also comprises a hallowed out half cylinder shape. In addition, the radome comprises a plurality of tabs 26 the function to fasten the radome to a housing (not shown). In this example, the tabs comprises screw holes 28 for fastening the radome to the housing.

Figure 4:
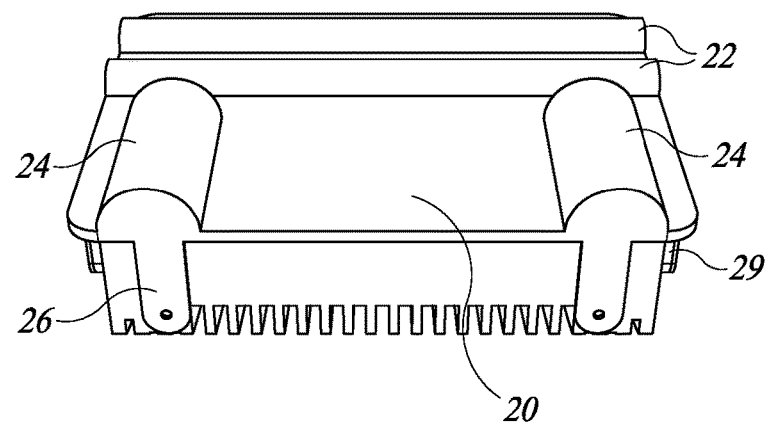
FIG. 4 is a diagram illustrating a second perspective view an example radome for patch antenna arrays.

A diagram illustrating a second perspective view an example radome for patch antenna arrays is shown in FIG. 4. The radome 20 is shown in position over a housing or chassis 29 that houses the PCB. The housing comprises mounting holes for screws or other suitable fasteners and is configured to mate with the tabs 26 of the radome. The receive and transmit portions 22, 24, respectively, are shown protruding from the surface of the radome.

Figure 5A:
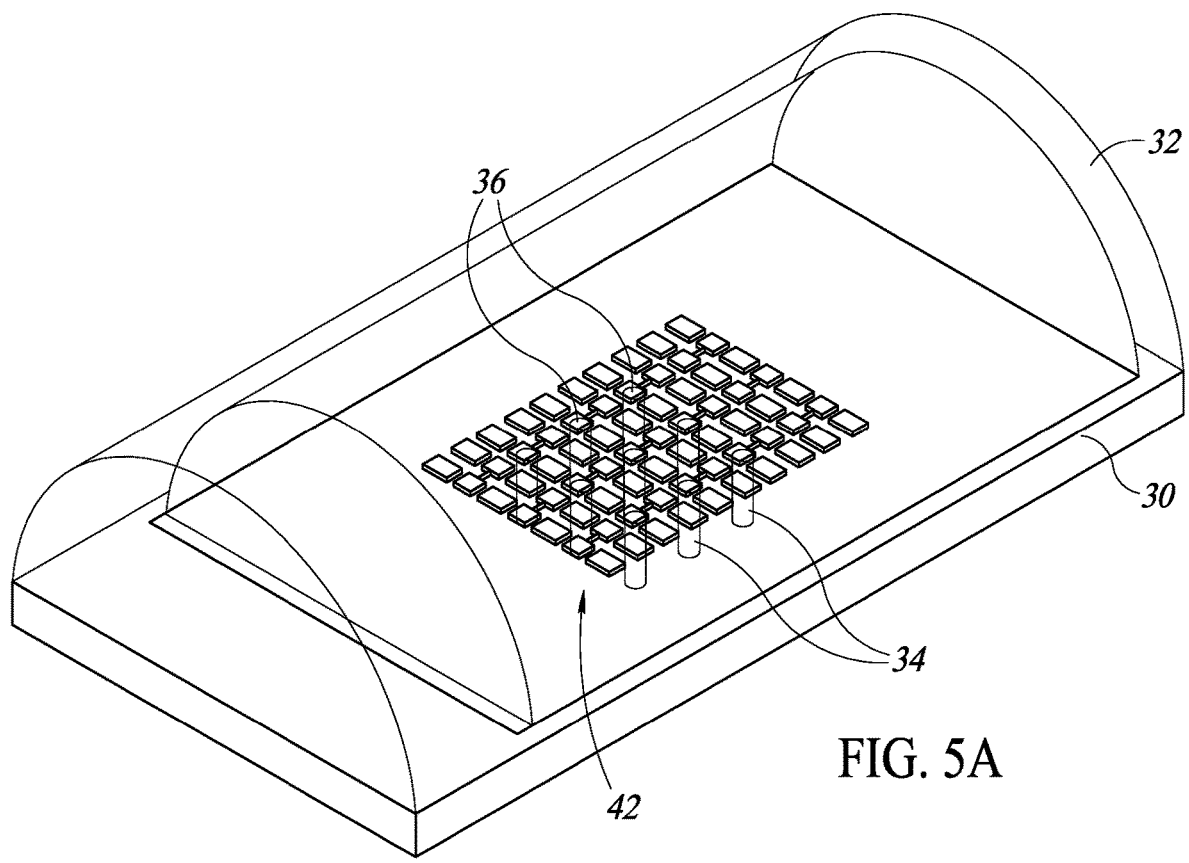
FIG. 5A is a diagram illustrating a perspective view of an example half cylinder shaped radome located over a transmit patch antenna array.
Figure 5B:
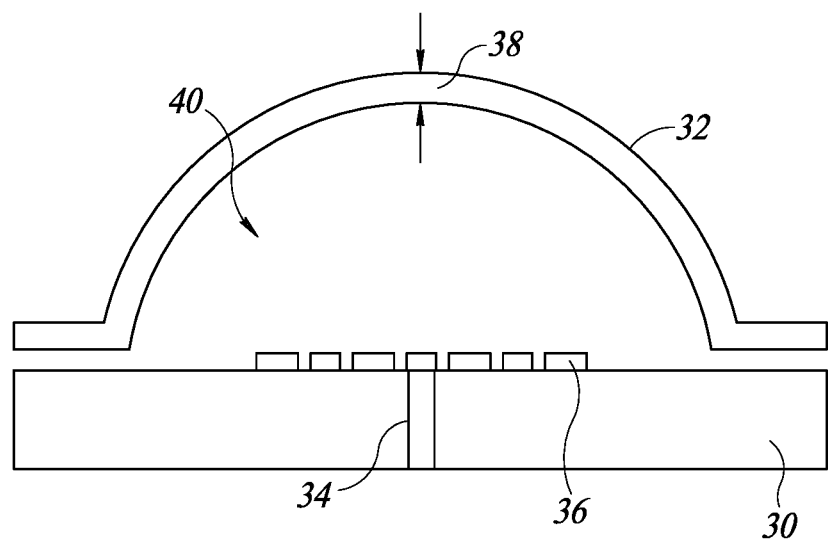
FIG. 5B is a diagram illustrating a side view of the example radome of FIG. 5A.

A diagram illustrating a perspective view of an example radome located over a transmit patch antenna array is shown in FIG. 5A. A diagram illustrating a side view of an example radome located over a transmit patch antenna array is shown in FIG. 5B. The half cylinder shaped radome 32 is shown in position over PCB 30 on which is fabricated patch antenna array 42 comprising a plurality of antenna patch elements 36. Also shown are high frequency vias 34 that electrically connects the patch antennas on one side of the PCB 30 to circuit traces on the opposite side.

In one embodiment, the radome 32 comprises a convex hallowed out half cylinder shape that forms an internal cavity or void 40. It is positioned over the patch antenna elements 36. The example radome disclosed herein is suitable for different patch antenna arrays located on the same plane printed on a PCB. The radome is constructed to have a certain thickness 38 that varies with the particular material of the radome and the frequency of the signal. The radius of curvature of the radome also varies depending on the implementation and physical layout of the patch antenna array. The half cylinder radome located over each patch antenna array may have a different radius and thickness depending on the characteristics of the underlying patch antenna array. For example, the radii of the radomes over receive antenna arrays may be different than that for transmit antenna arrays. As described supra, the example PCB shown herein comprises two different antennas, transmit and receive. Each of the transmit and receive antennas radiates in a different pattern and has different gain and side lobes. These characteristics require a different radome for each antenna.

In one embodiment, the radome for transmit antennas comprises a curved 'U' shape half cylinder having precise width and length, thickness, radius, and height above the PCB. Such a radome overcomes the disadvantages and problems of prior art radomes.

Note that the half cylinder shape contributes to equalizing the phase delay for each electromagnetic wave that radiates from the antenna and travels through the radome. Due to the half cylinder shaped geometry, the spherical shape of the radiated wave intersects with the surface of the radome at a substantially perpendicular angle. According to well-known electromagnetic theory, assuming that the wave is a plane wave at the area of intersecting, the scatter angle inside the radome is identical to the incident angle. Thus, the radiation pattern is substantially unaffected while passing through the radome.

Note that the thickness of the transmit antenna radome is determined in accordance with, inter alia, the material, dielectric constant, and the frequency of the antenna. In one embodiment, one half wavelength (i.e. the relative wavelength) is selected which causes a standing wave to be created inside the radome which radiates outwards with maximum gain.

It is noted that prior art radomes in common use today are typically flat. At high frequencies, however, the flat radome creates problems and reduces performance regarding several radar characteristics such as radiation pattern, gain, sidelobes, isolation, and impedance matching. The flat radome having the same width and height above the antenna has a much narrower field of view and does not match the gain of the antenna.

The transmit antenna radome may be constructed of any suitable material such as a dielectric material. For example, the dielectric material may comprise thermoplastic polyetherimide based polymer, fiberglass, plastic, polytetrafluoroethylene (PTFE), PTFE coated fabric, and polyurethane. In one embodiment, Ultem 1000 resin, manufactured by GE Plastics, Pittsfield, Mass., United States, is used to construct the radome. Ultem resin has characteristics of high heat resistance, high strength and modulus and broad chemical resistance up to high temperatures. The material relative permittivity (dielectric constant) $D_k$ of Ultem resin is 3.05 and the material loss tangent $D_f$ is 0.003. It is noted that the choice of material and frequency of the signal determine the thickness of the material to achieve minimum energy loss therethrough.

In one embodiment, the thickness of the material forming the curved half cylinder shaped portion over the transmit patch antenna array is $\lambda_r/2$ where $\lambda_r$ is the relative wavelength of the signal within the material. In one embodiment the thickness is approximately 1.1 mm which is also the approximate height above the PCB. The radius of curvature of the radome is approximately 14 mm. The minimum distance between the top and bottom of the transmit antenna to the lid of the radome is approximately 12 mm. Note that the curved portion of the radome is not intended to act as a lens and thus it has no focal point.

Several advantages of the radome include: (1) the characteristics of the radome over each individual patch antenna array on the same PCB can be adjusted for each antenna, e.g., radius, thickness, etc.; (2) coherent results with the antenna are achieved as compared to without any radome (i.e. used as reference antenna); (3) the radome is essentially transparent to the RF energy passing through it; and (4) the curved shape of the radome provides additional mechanical strength.

It is appreciated that radomes having other shapes can be constructed, such as spherical, geodesic, planar, etc. depending on the particular application, using any desired construction material such as plastics, fiberglass, PTFE-coated fabric, etc.

Performance results of a transmit patch antenna array with the radome of the present invention and no radome at all are presented infra. It is observed in the graphs shown that the radome of the present invention presents minimal distortion in gain and sidelobes in both azimuth and elevation.

Figure 6:
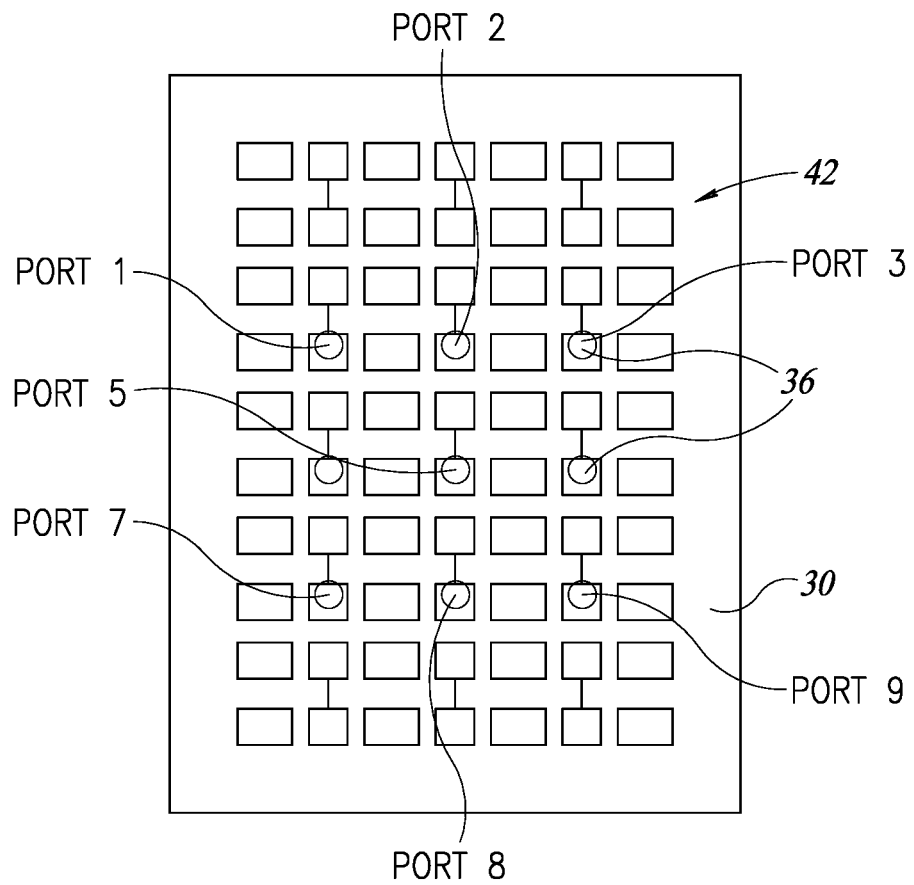
FIG. 6 is a diagram illustrating an example transmit patch antenna array.

A diagram illustrating an example transmit patch antenna array is shown in FIG. 6. The example patch antenna array 40 used for simulation purposes is shown having nine antenna elements or ports 36, namely ports 1 through 9, fabricated on PCB 30. The invention, however, can be used with patch antenna arrays having any number of ports or elements.

Figure 7:
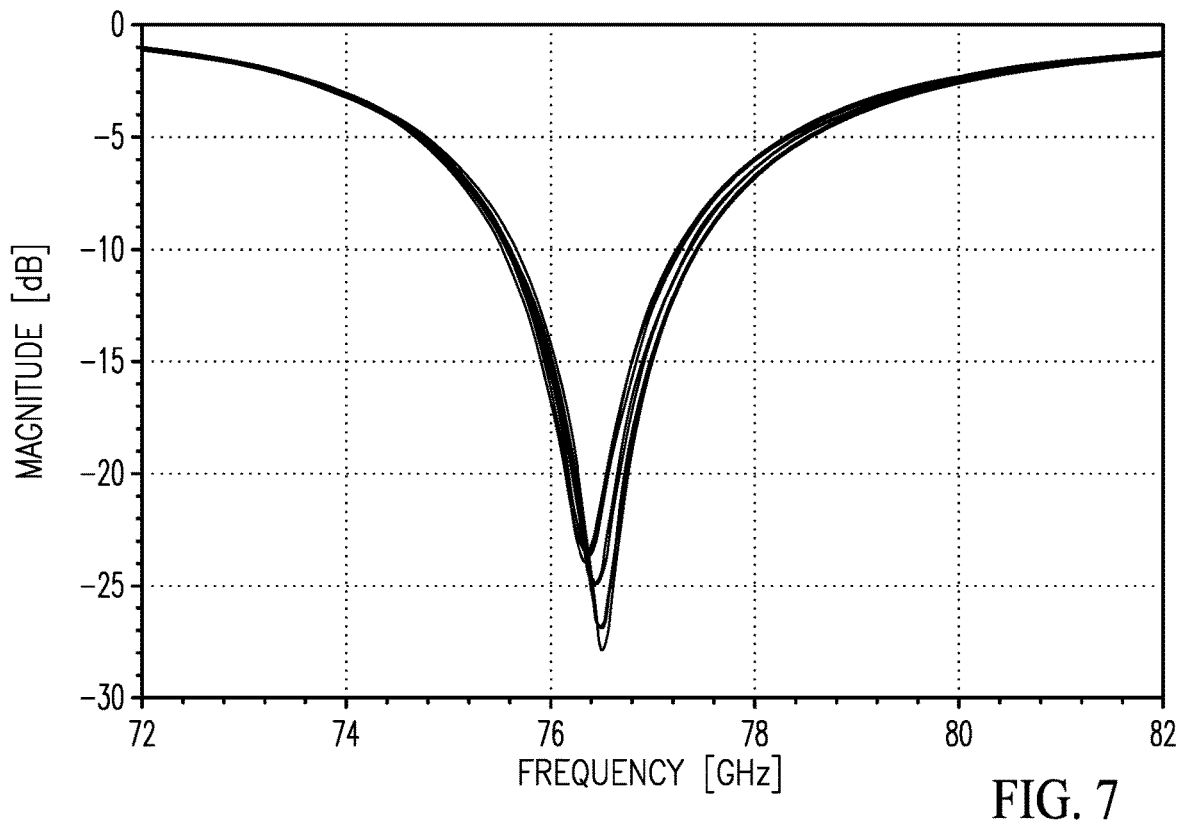
FIG. 7 is a diagram illustrating return loss graph for an example radome for a transmit patch antenna array.

A diagram illustrating return loss graph for an example radome for a transmit patch antenna array is shown in FIG. 7. In this graph, the return loss $S_{i,i}$ parameter is shown for ports 1 through 9. For most of the ports, the return loss is approximately −25 dB around 76.5 GHz.

Figure 8:
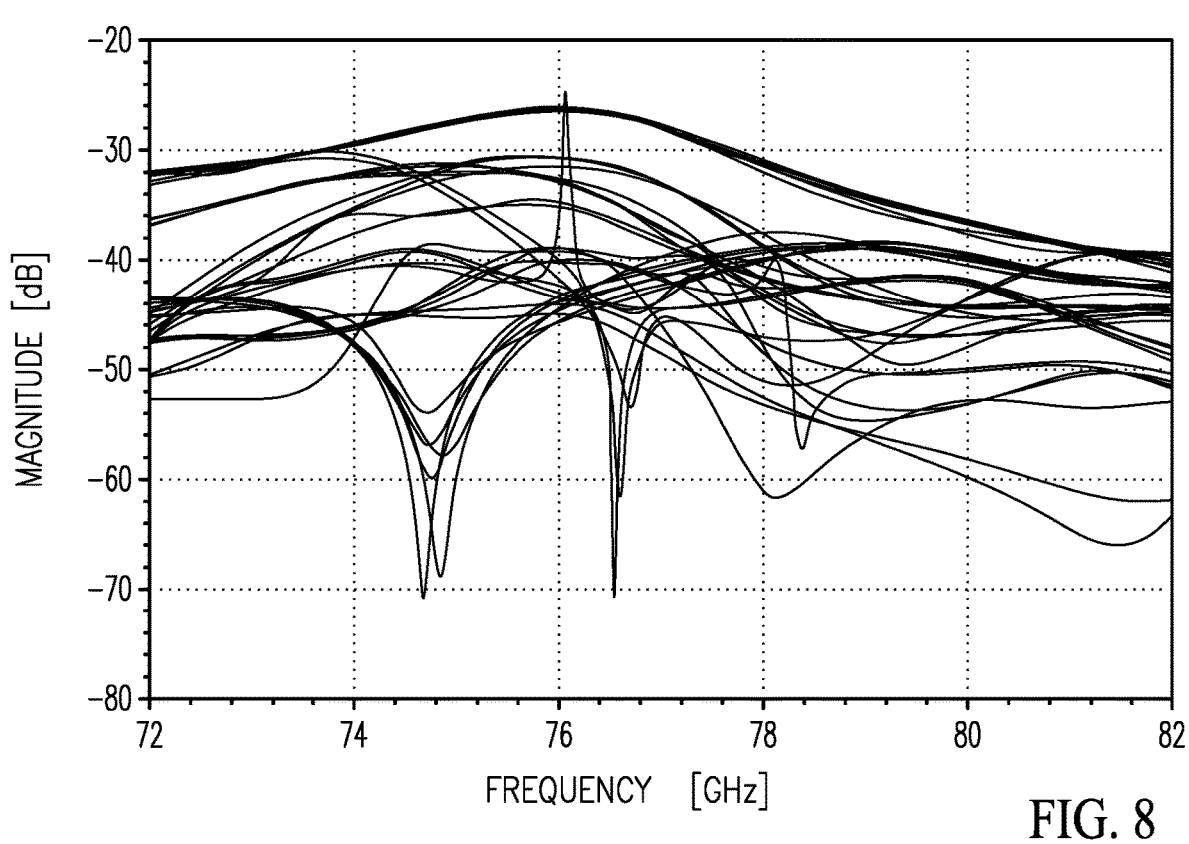
FIG. 8 is a diagram illustrating isolation graph for an example radome for a transmit patch antenna array.

A diagram illustrating isolation graph for an example radome for a transmit patch antenna array is shown in FIG. 8. In this graph, the isolation $S_{i,j}$ (i≠j) is shown for ports 1 through 9. The isolation ranges between approximately −24 dB and −67 dB.

Figure 9:
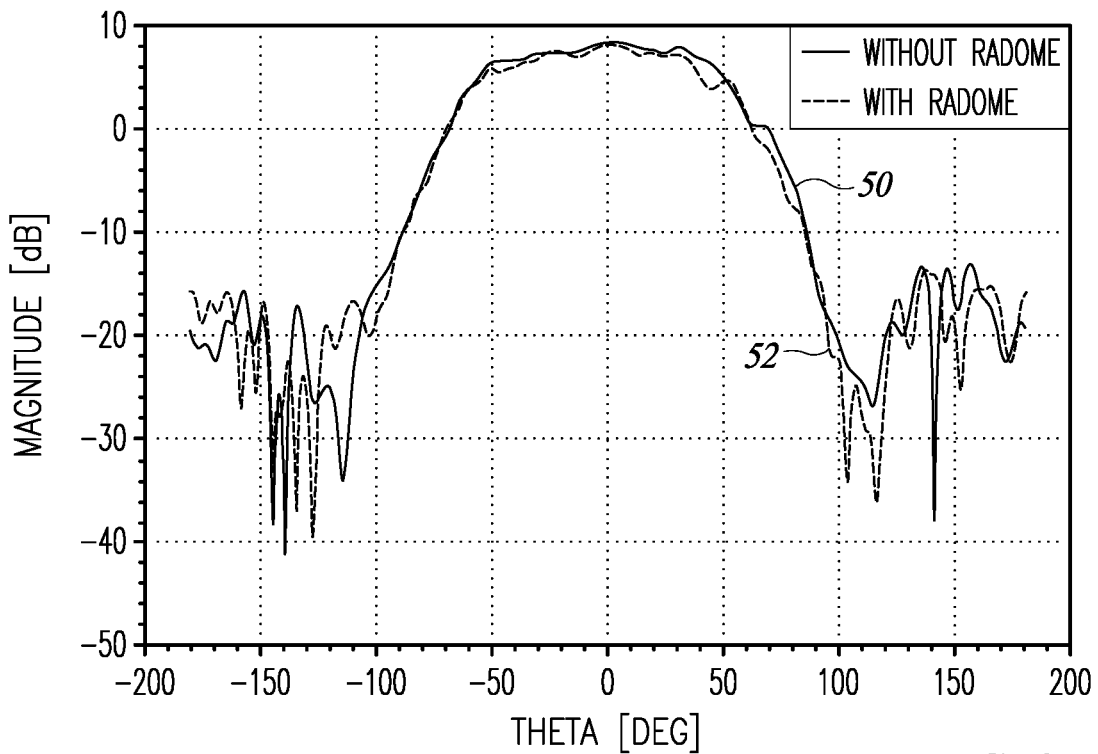
FIG. 9 is a diagram illustrating azimuth gain for port 1 of an example radome for a transmit patch antenna array.

A diagram illustrating azimuth gain for port 1 of an example radome for a transmit patch antenna array is shown in FIG. 9. In this graph, the azimuth gain for the port 1 signal is shown for both without the radome (i.e. reference gain) (trace 50) and with the radome of the present invention (trace 52). As shown, the gain with the radome substantially tracks the gain without the radome and barely impacts the wide field of view (±100 degrees) of the antenna element.

Figure 10:
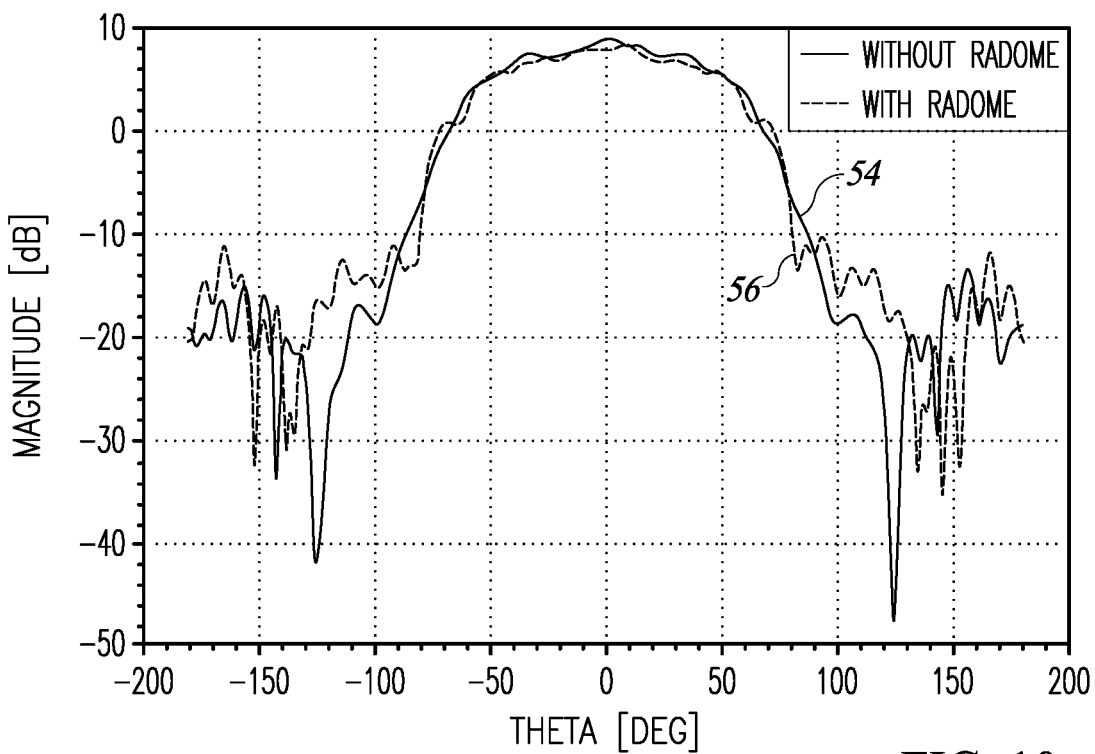
FIG. 10 is a diagram illustrating azimuth gain for port 2 of an example radome for a transmit patch antenna array.

A diagram illustrating azimuth gain for port 2 of an example radome for a transmit patch antenna array is shown in FIG. 10. In this graph, the azimuth gain for the port 2 signal is shown for both without the radome (trace 54) and with the radome of the present invention (trace 56). As shown, the gain with the radome substantially tracks the gain without the radome and barely impacts the wide field of view (±100 degrees) of the antenna element.

Figure 11:
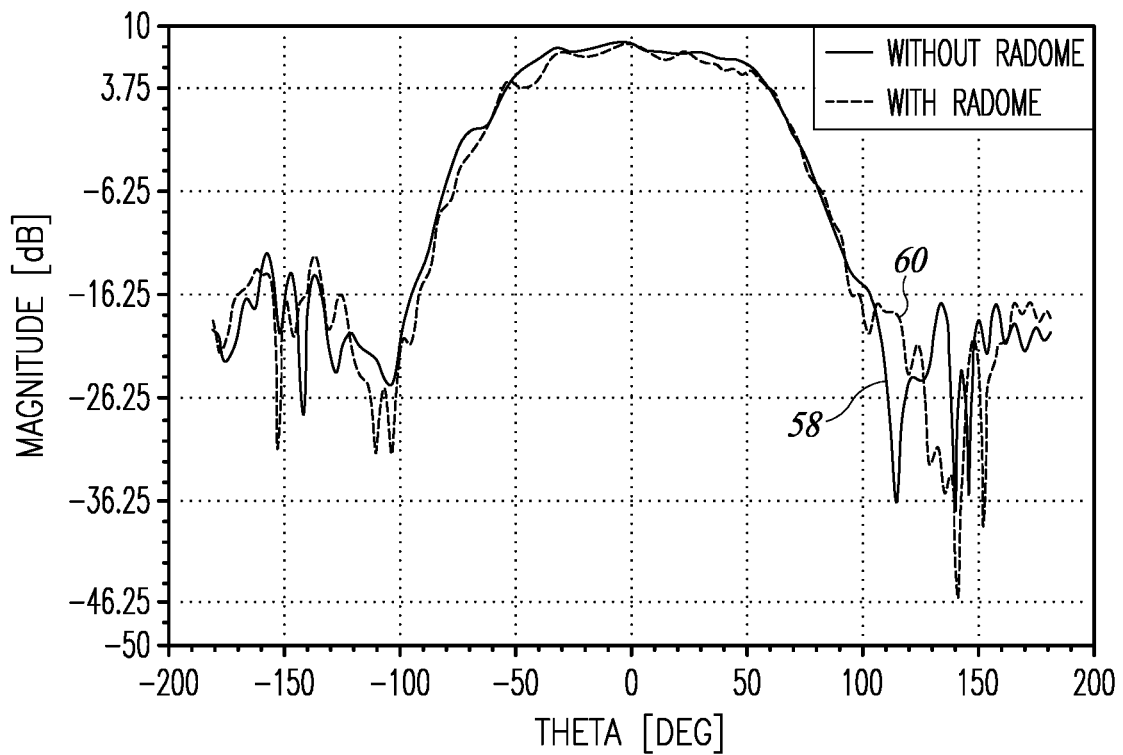
FIG. 11 is a diagram illustrating azimuth gain for port 3 of an example radome for a transmit patch antenna array.

A diagram illustrating azimuth gain for port 3 of an example radome for a transmit patch antenna array is shown in FIG. 11. In this graph, the azimuth gain for the port 3 signal is shown for both without the radome (trace 58) and with the radome of the present invention (trace 60). As shown, the gain with the radome substantially tracks the gain without the radome and barely impacts the wide field of view (±100 degrees) of the antenna element.

Figure 12:
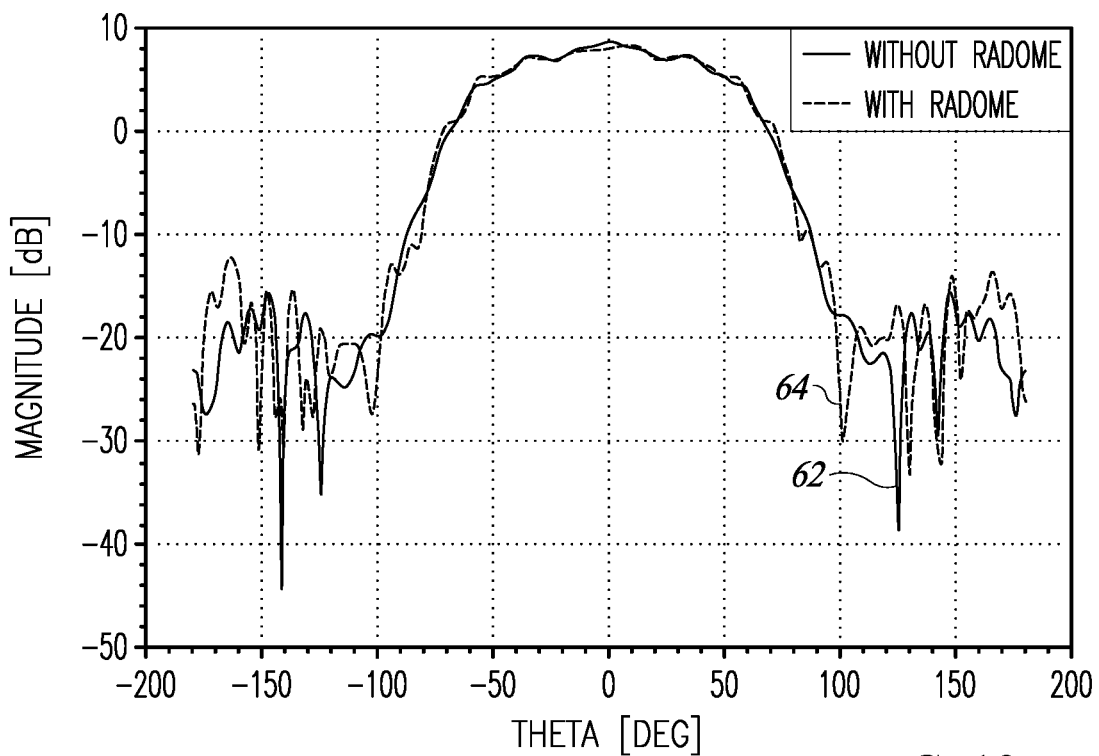
FIG. 12 is a diagram illustrating azimuth gain for port 5 of an example radome for a transmit patch antenna array.

A diagram illustrating azimuth gain for port 5 of an example radome for a transmit patch antenna array is shown in FIG. 12. In this graph, the azimuth gain for the port 5 signal is shown for both without the radome (trace 62) and with the radome of the present invention (trace 64). As shown, the gain with the radome substantially tracks the gain without the radome and barely impacts the wide field of view (±100 degrees) of the antenna element.

Figure 13:
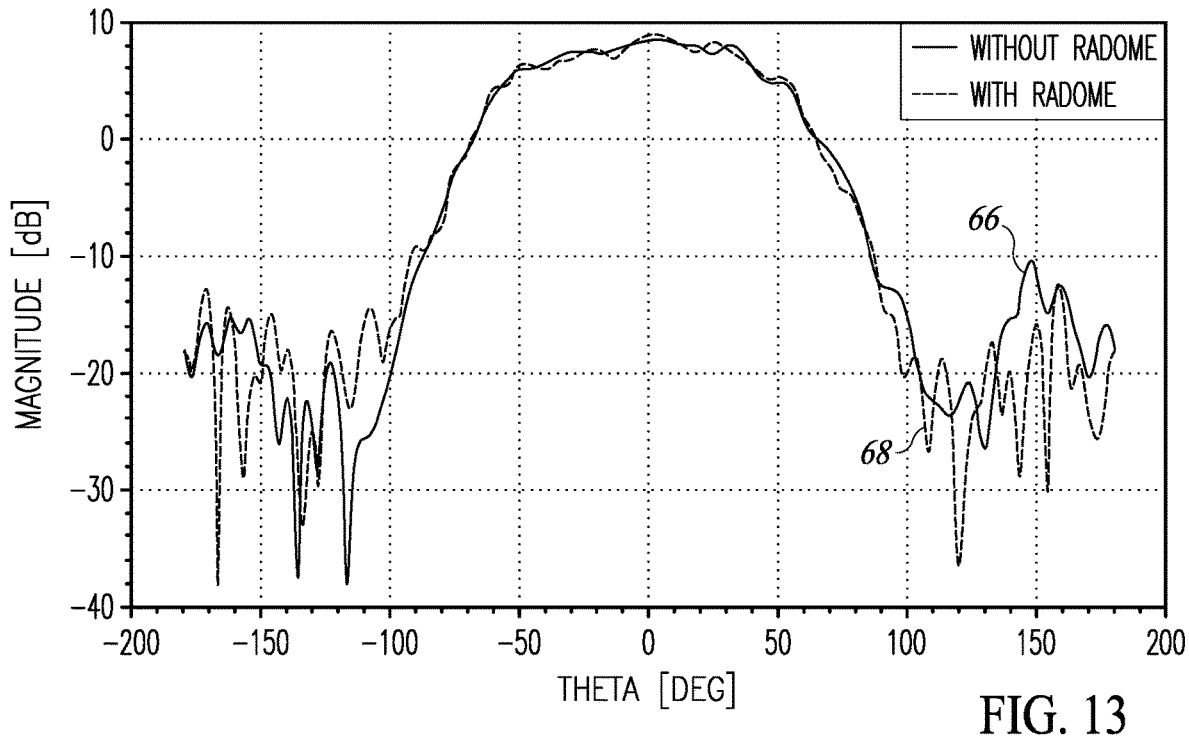
FIG. 13 is a diagram illustrating azimuth gain for port 7 of an example radome for a transmit patch antenna array.

A diagram illustrating azimuth gain for port 7 of an example radome for a transmit patch antenna array is shown in FIG. 13. In this graph, the azimuth gain for the port 7 signal is shown for both without the radome (trace 66) and with the radome of the present invention (trace 68). As shown, the gain with the radome substantially tracks the gain without the radome and barely impacts the wide field of view (±100 degrees) of the antenna element.

Figure 14:
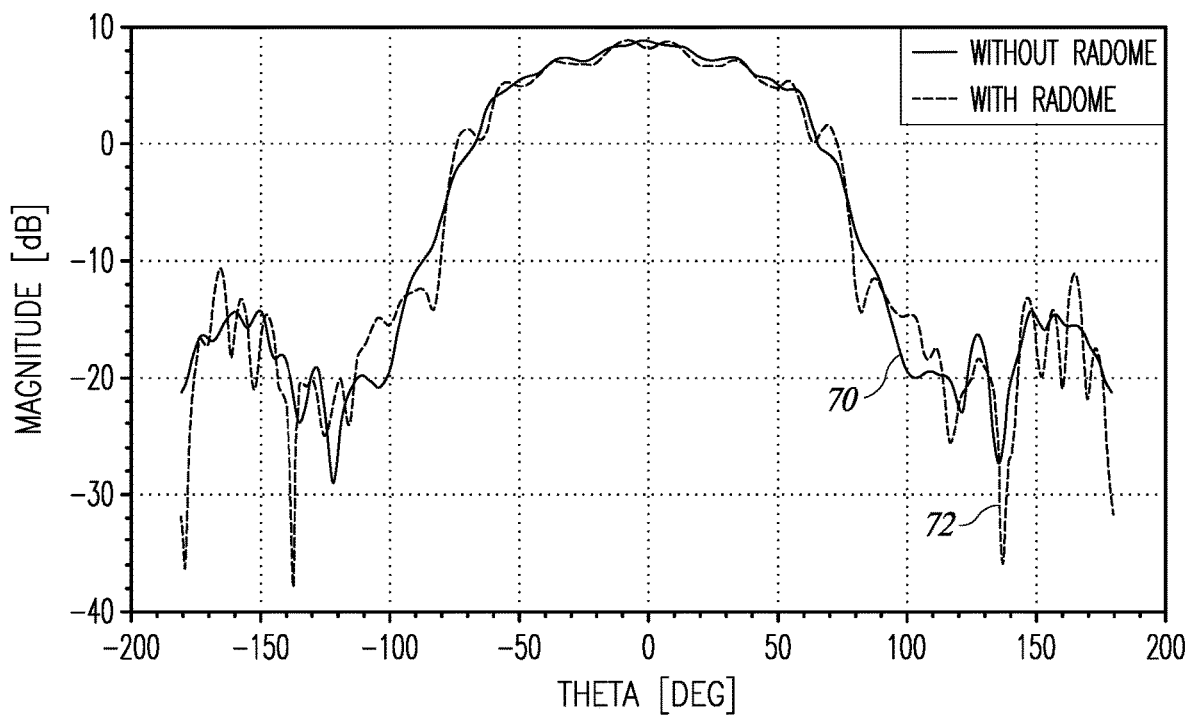
FIG. 14 is a diagram illustrating azimuth gain for port 8 of an example radome for a transmit patch antenna array.

A diagram illustrating azimuth gain for port 8 of an example radome for a transmit patch antenna array is shown in FIG. 14. In this graph, the azimuth gain for the port 8 signal is shown for both without the radome (trace 70) and with the radome of the present invention (trace 72). As shown, the gain with the radome substantially tracks the gain without the radome and barely impacts the wide field of view (±100 degrees) of the antenna element.

Figure 15:
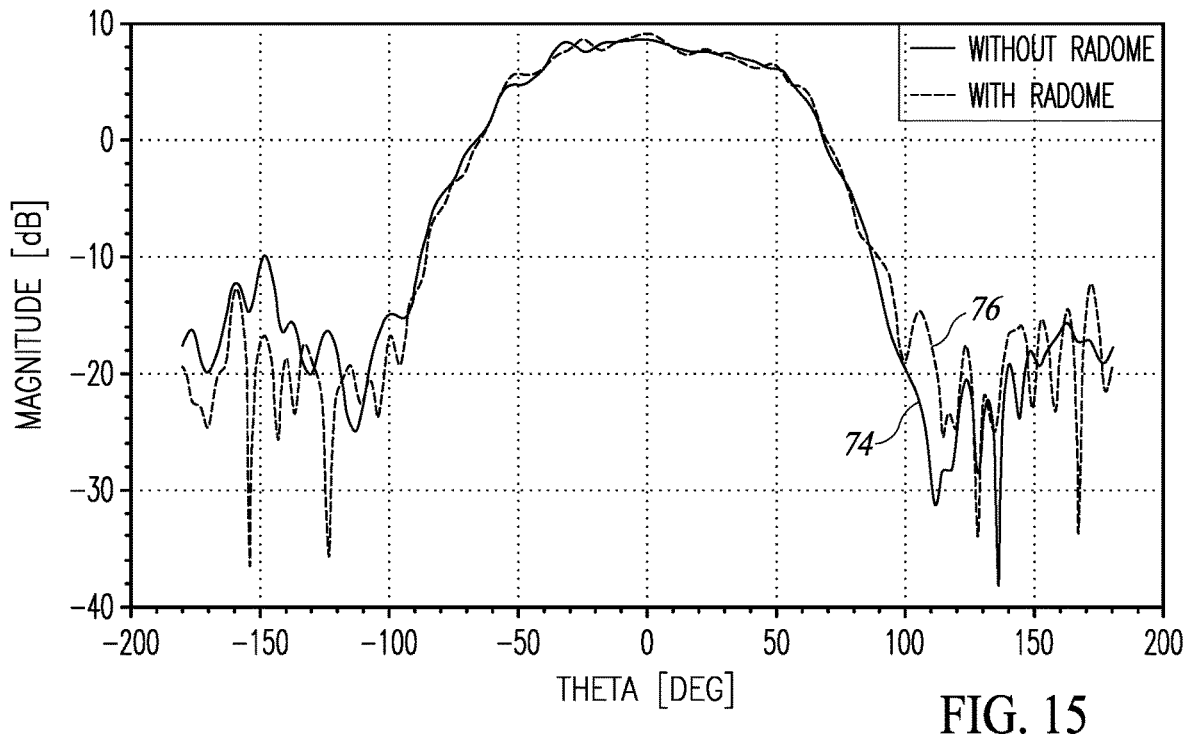
FIG. 15 is a diagram illustrating azimuth gain for port 9 of an example radome for a transmit patch antenna array.

A diagram illustrating azimuth gain for port 9 of an example radome for a transmit patch antenna array is shown in FIG. 15. In this graph, the azimuth gain for the port 9 signal is shown for both without the radome (trace 74) and with the radome of the present invention (trace 76). As shown, the gain with the radome substantially tracks the gain without the radome and barely impacts the wide field of view (±100 degrees) of the antenna element.

Figure 16:
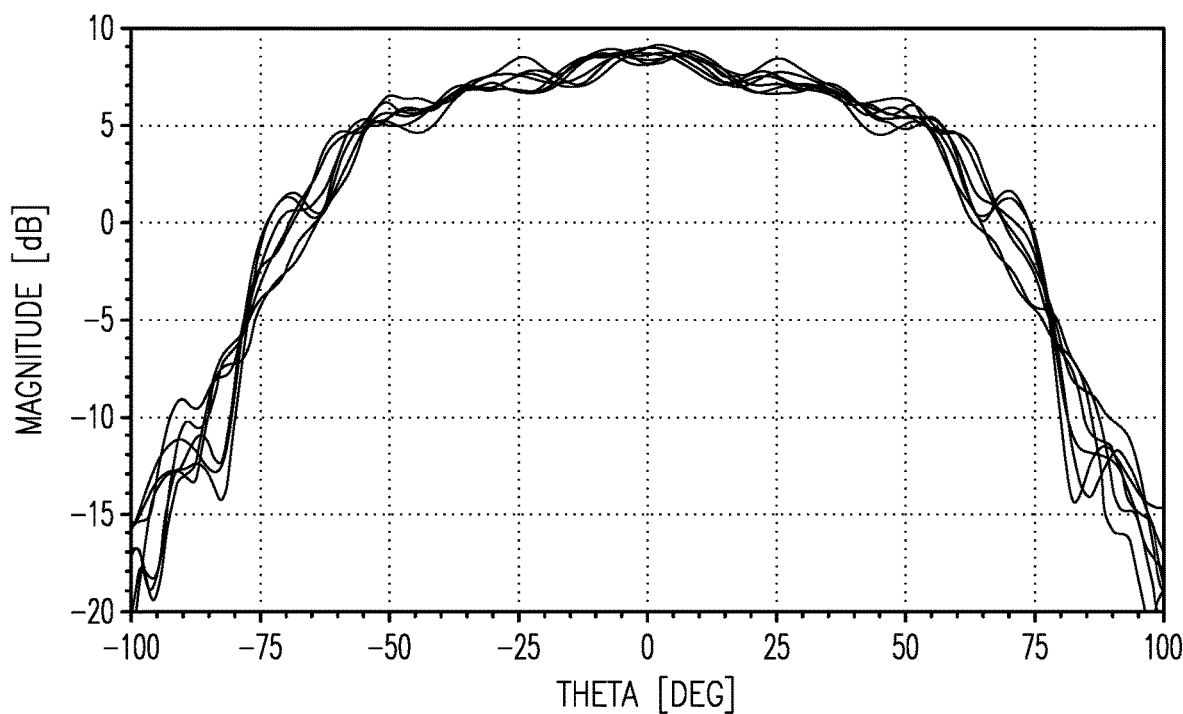
FIG. 16 is a diagram illustrating a comparison of azimuth gain of an example radome for a transmit patch antenna array.

A diagram illustrating a comparison of azimuth gain of an example radome for a transmit patch antenna array is shown in FIG. 16. In this graph, a comparison of the azimuth gains of ports 1, 2, 3, 5, 7, 8, and 9 are shown with the radome of the present invention. Note that the gain performance of the different ports track each other well between ±100 degree field of view.

Figure 17:
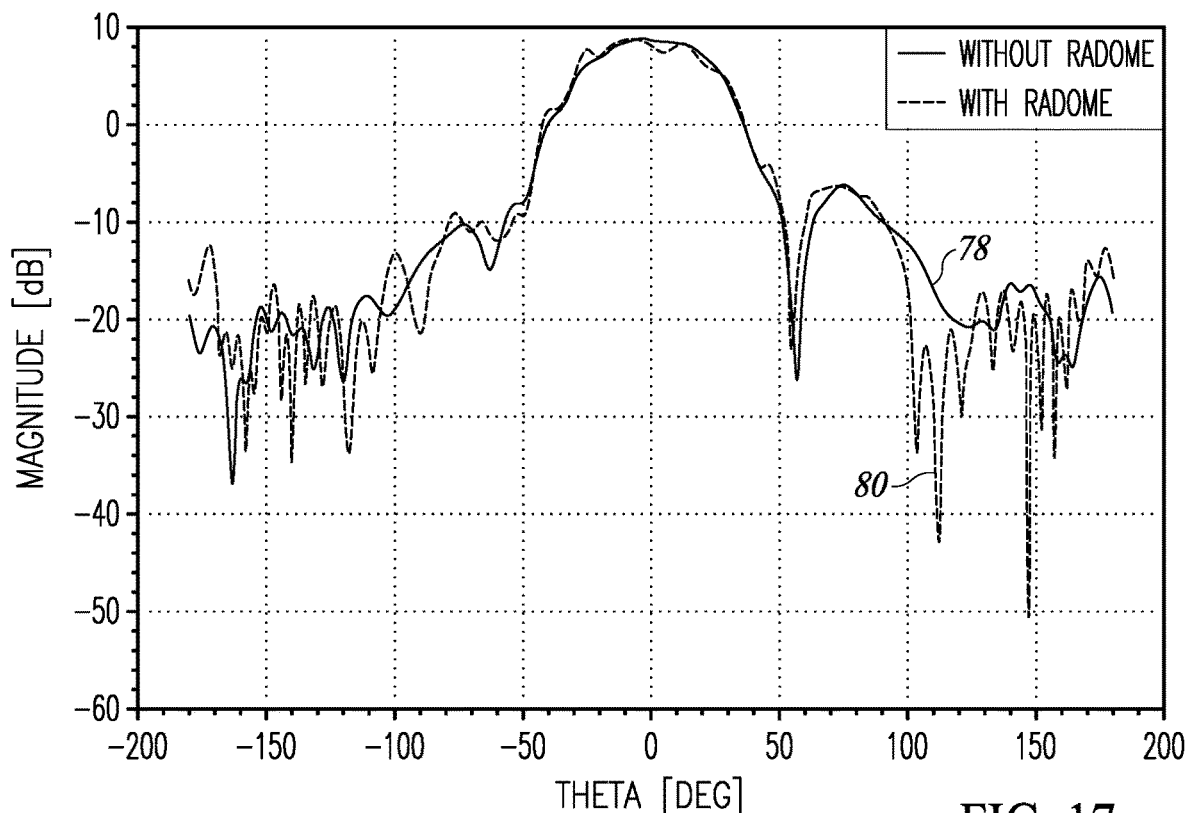
FIG. 17 is a diagram illustrating elevation gain for port 1 of an example radome for a transmit patch antenna array.

A diagram illustrating elevation gain for port 1 of an example radome for a transmit patch antenna array is shown in FIG. 17. In this graph, the elevation gain for the port 1 signal is shown for both without the radome (i.e. reference gain) (trace 78) and with the radome of the present invention (trace 80). As shown, the gain with the radome substantially tracks the gain without the radome and barely impacts the field of view (±50 degrees) of the antenna element.

Figure 18:
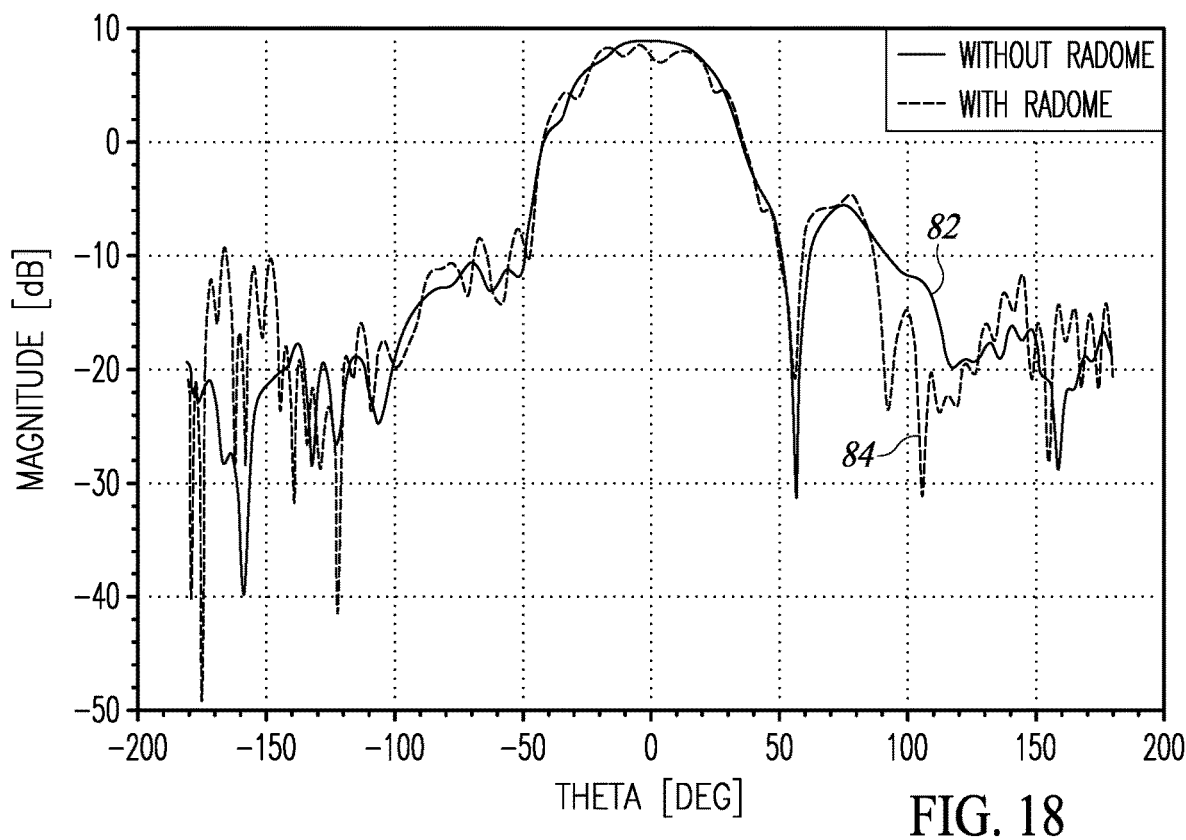
FIG. 18 is a diagram illustrating elevation gain for port 2 of an example radome for a transmit patch antenna array.

A diagram illustrating elevation gain for port 2 of an example radome for a transmit patch antenna array is shown in FIG. 18. In this graph, the elevation gain for the port 2 signal is shown for both without the radome (trace 82) and with the radome of the present invention (trace 84). As shown, the gain with the radome substantially tracks the gain without the radome and barely impacts the field of view (±50 degrees) of the antenna element.

Figure 19:
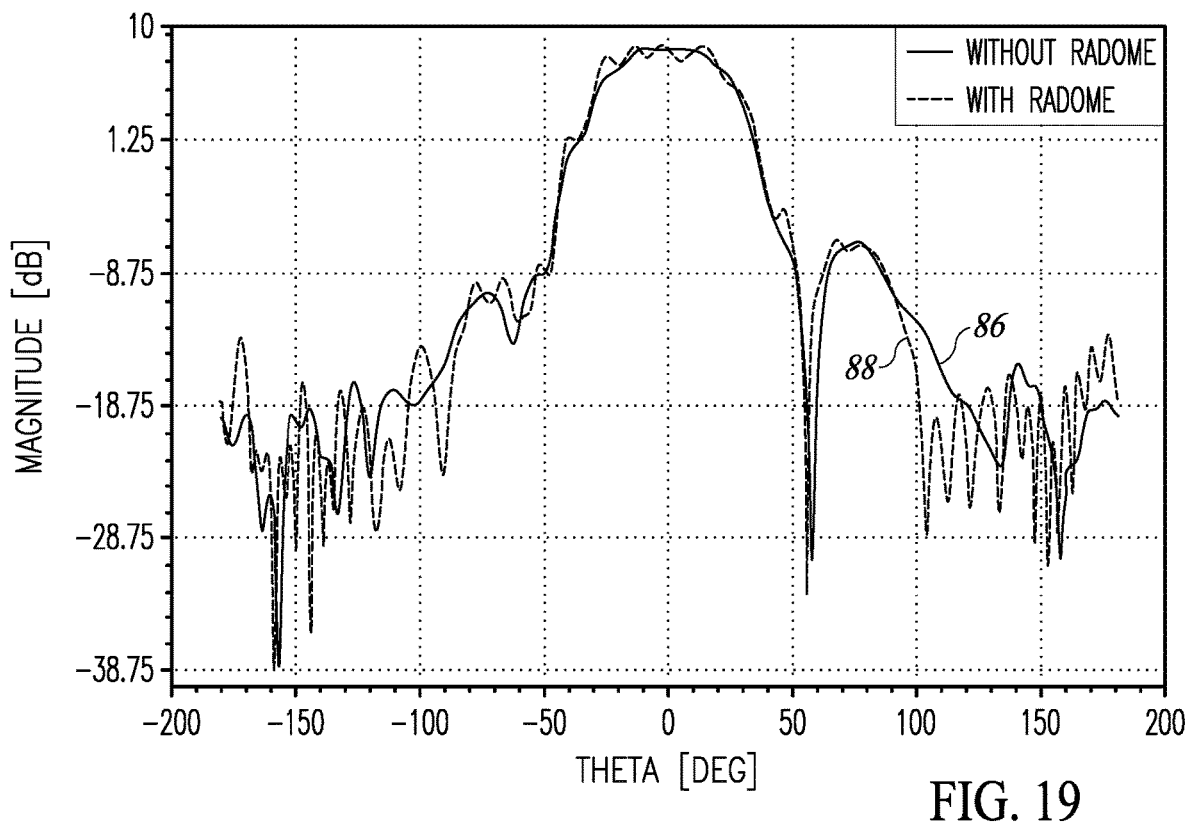
FIG. 19 is a diagram illustrating elevation gain for port 3 of an example radome for a transmit patch antenna array.

A diagram illustrating elevation gain for port 3 of an example radome for a transmit patch antenna array is shown in FIG. 19. In this graph, the elevation gain for the port 3 signal is shown for both without the radome (trace 86) and with the radome of the present invention (trace 88). As shown, the gain with the radome substantially tracks the gain without the radome and barely impacts the field of view (±50 degrees) of the antenna element.

Figure 20:
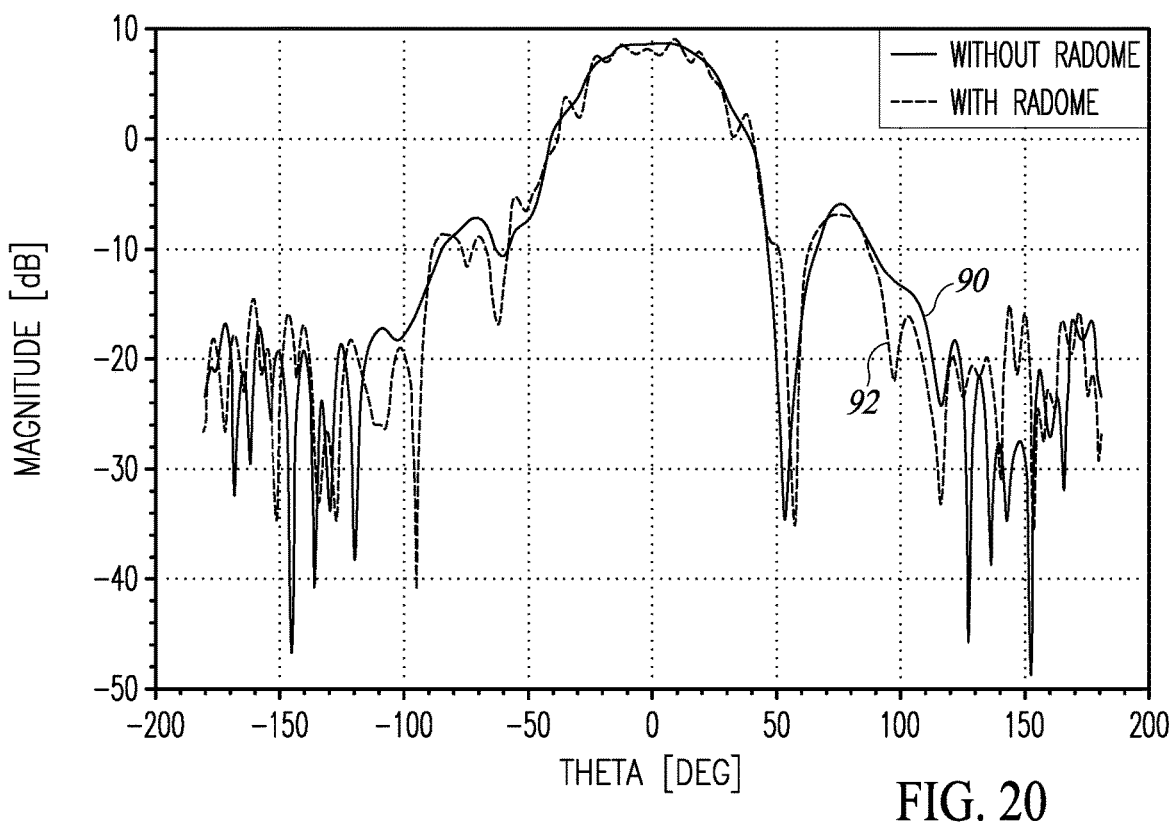
FIG. 20 is a diagram illustrating elevation gain for port 5 of an example radome for a transmit patch antenna array.

A diagram illustrating elevation gain for port 5 of an example radome for a transmit patch antenna array is shown in FIG. 20. In this graph, the elevation gain for the port 5 signal is shown for both without the radome (trace 90) and with the radome of the present invention (trace 92). As shown, the gain with the radome substantially tracks the gain without the radome and barely impacts the field of view (±50 degrees) of the antenna element.

Figure 21:
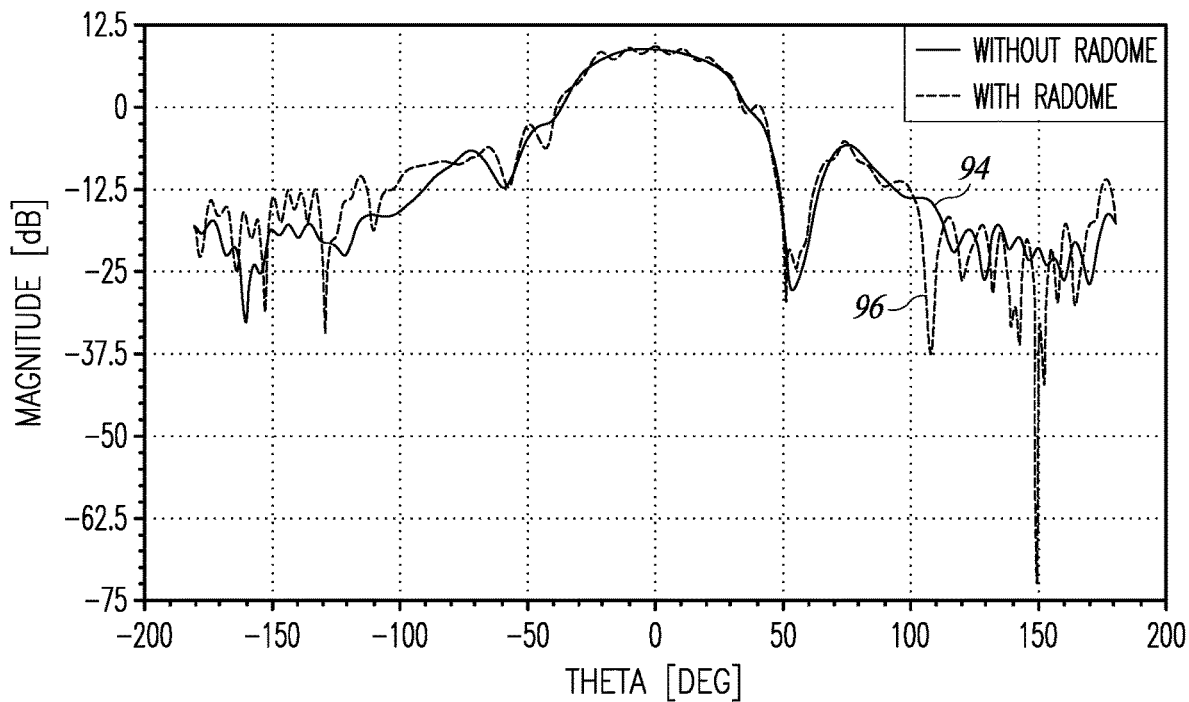
FIG. 21 is a diagram illustrating elevation gain for port 7 of an example radome for a transmit patch antenna array.

A diagram illustrating elevation gain for port 7 of an example radome for a transmit patch antenna array is shown in FIG. 21. In this graph, the elevation gain for the port 7 signal is shown for both without the radome (trace 94) and with the radome of the present invention (trace 96). As shown, the gain with the radome substantially tracks the gain without the radome and barely impacts the field of view (±50 degrees) of the antenna element.

Figure 22:
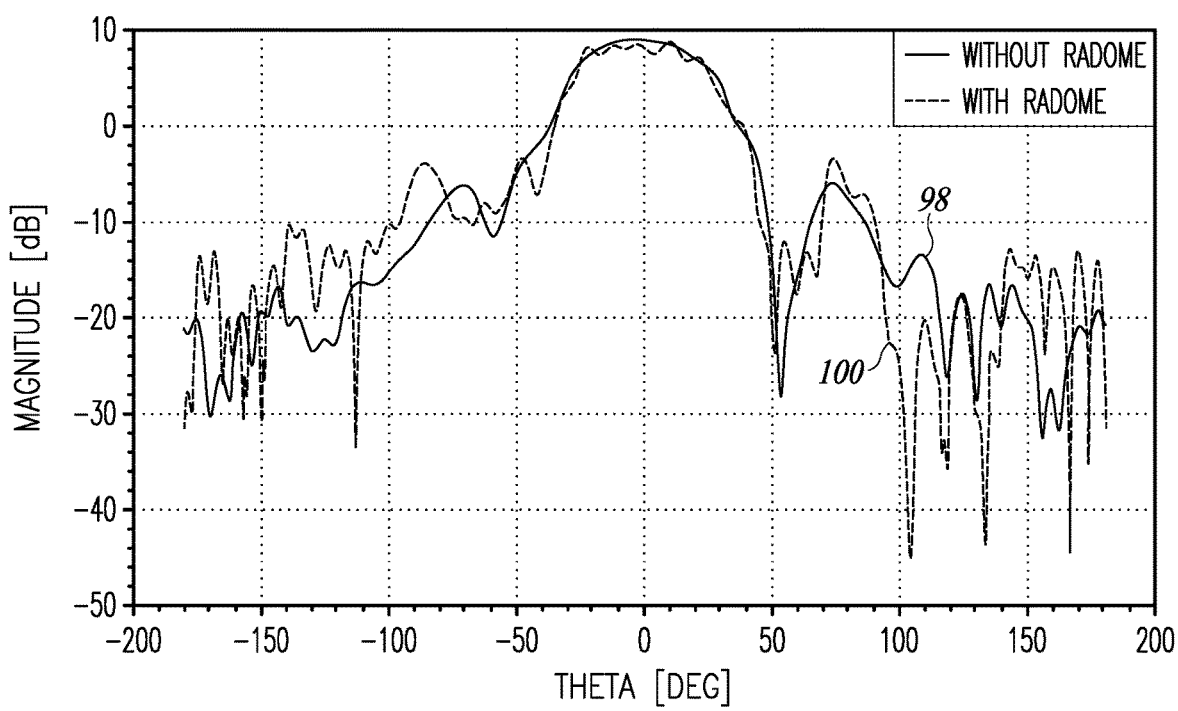
FIG. 22 is a diagram illustrating elevation gain for port 8 of an example radome for a transmit patch antenna array.

A diagram illustrating elevation gain for port 8 of an example radome for a transmit patch antenna array is shown in FIG. 22. In this graph, the elevation gain for the port 8 signal is shown for both without the radome (trace 98) and with the radome of the present invention (trace 100). As shown, the gain with the radome substantially tracks the gain without the radome and barely impacts the field of view (±50 degrees) of the antenna element.

Figure 23:
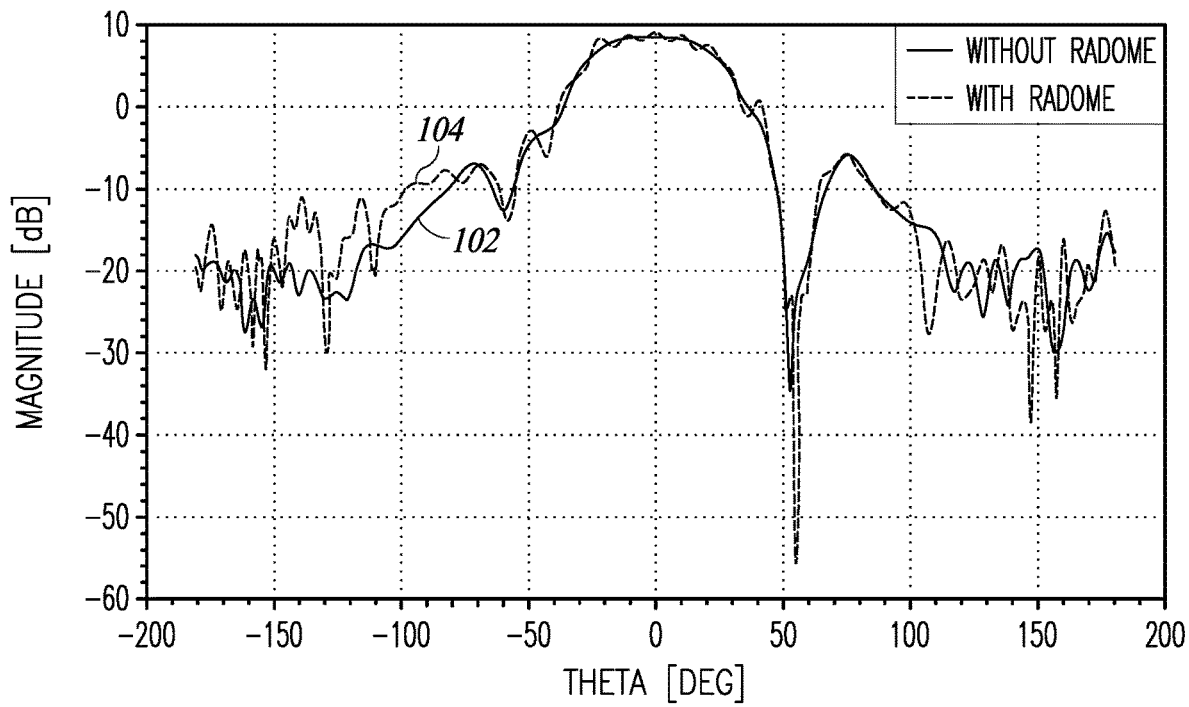
FIG. 23 is a diagram illustrating elevation gain for port 9 of an example radome for a transmit patch antenna array.

A diagram illustrating elevation gain for port 9 of an example radome for a transmit patch antenna array is shown in FIG. 23. In this graph, the elevation gain for the port 9 signal is shown for both without the radome (trace 102) and with the radome of the present invention (trace 104). As shown, the gain with the radome substantially tracks the gain without the radome and barely impacts the field of view (±50 degrees) of the antenna element.

Figure 24:
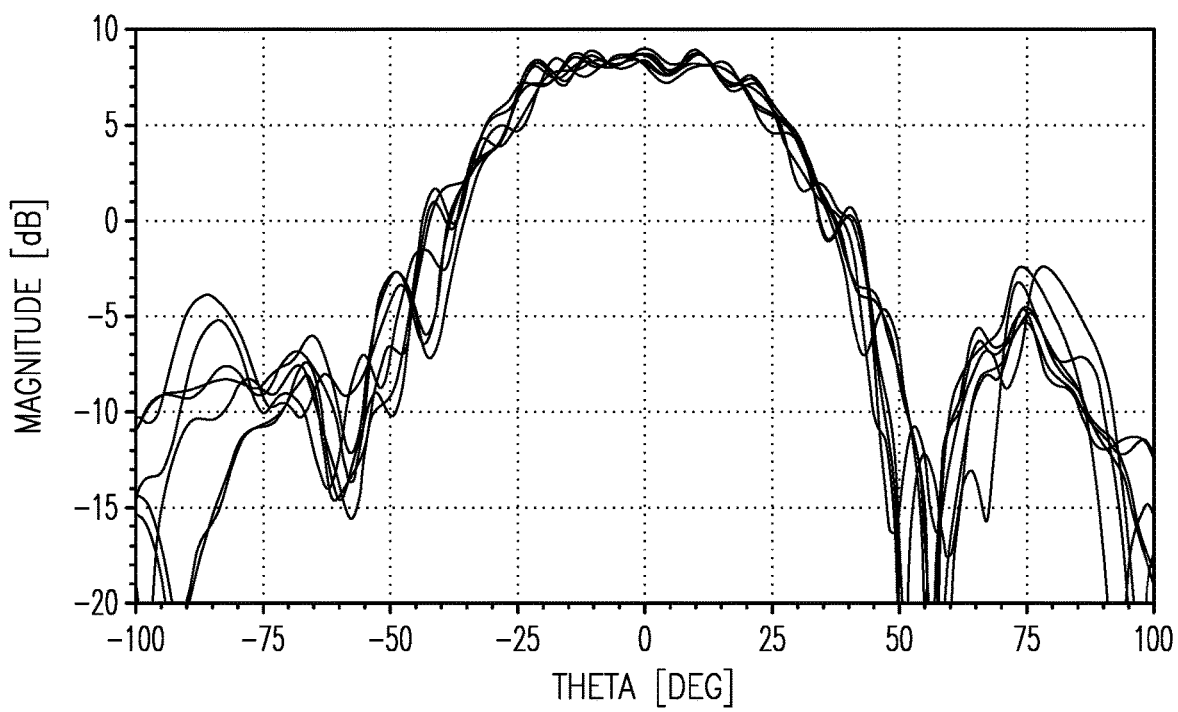
FIG. 24 is a diagram illustrating a comparison of elevation gain of an example radome for a transmit patch antenna array.

A diagram illustrating a comparison of elevation gain of an example radome for a transmit patch antenna array is shown in FIG. 24. In this graph, a comparison of the elevation gains of ports 1, 2, 3, 5, 7, 8, and 9 are shown with the radome of the present invention. Note that the gain performance of the different ports track each other well between ±50 degree field of view.

Figure 25:
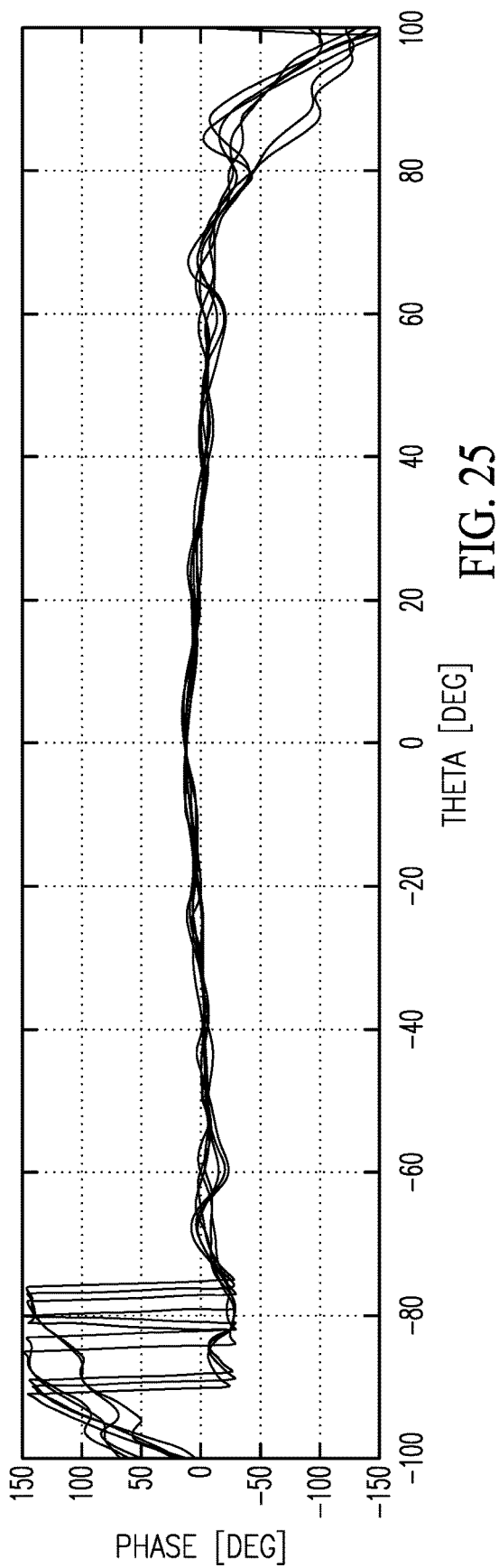
FIG. 25 is a diagram illustrating a comparison of azimuth phase of an example radome for a transmit patch antenna array.

A diagram illustrating a comparison of azimuth phase of an example radome for a transmit patch antenna array is shown in FIG. 25. In this graph, a comparison of the azimuth phase of ports 1, 2, 3, 5, 7, 8, and 9 are shown with the radome of the present invention. Note that the phase performance of the different ports track each other well between approximately ±80 degree field of view.

Figure 26B:
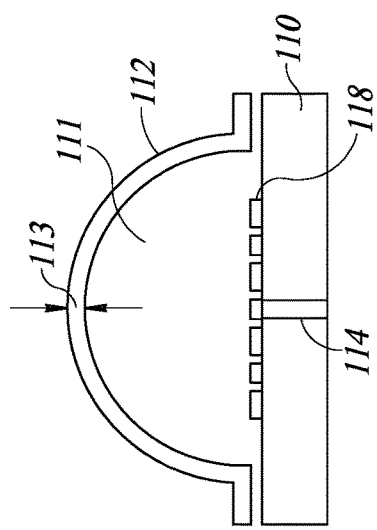
FIG. 26B is a diagram illustrating a side view of the example radome of FIG. 26A.
Figure 26A:
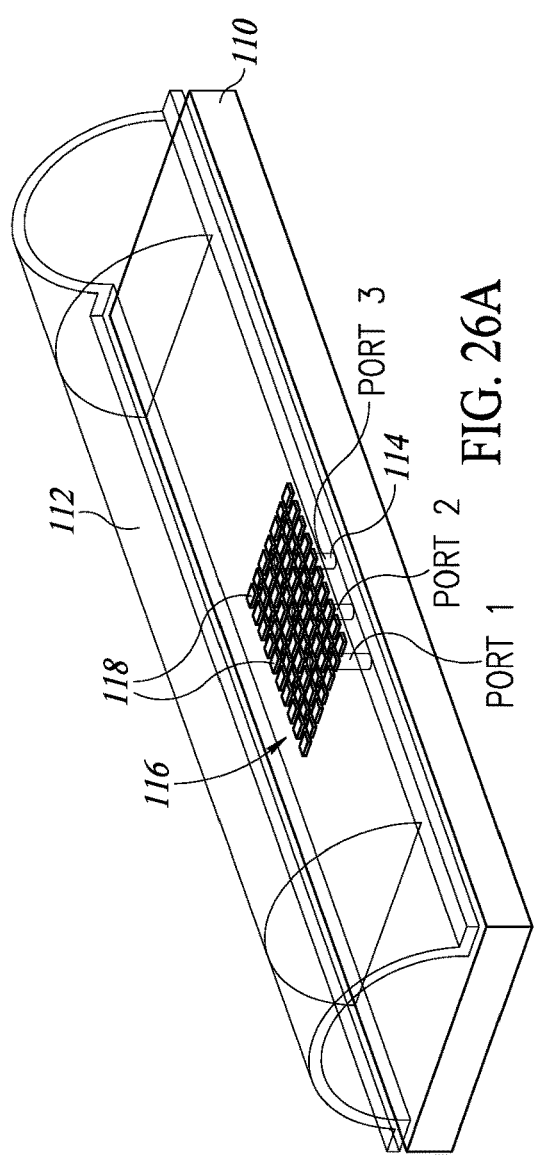
FIG. 26A is a diagram illustrating a perspective view of an example half cylinder shaped radome located over a receive patch antenna array.

A diagram illustrating a perspective view of an example radome located over a receive patch antenna array is shown in FIG. 26A. A diagram illustrating a side view of an example radome located over a receive patch antenna array is shown in FIG. 26B. The half cylinder shaped radome 112 is shown in position over PCB 110 on which is fabricated patch antenna array 116 comprising a plurality of antenna patch elements 118. Also shown are high frequency vias 114 that electrically connects the patch antennas on one side of the PCB 110 to circuit traces on the opposite side.

In one embodiment, the radome 112 comprises a convex hallowed out half cylinder shape that forms an internal cavity or void 111. It is positioned over the patch antenna elements 118. The example radome disclosed herein is suitable for different patch antenna arrays located on the same plane printed on a PCB. The radome is constructed to have a certain thickness 113 that varies with the particular material of the radome and the frequency of the signal. The radius of curvature of the radome also varies depending on the implementation and physical layout of the patch antenna array. The half cylinder radome located over each patch antenna array may have a different radius and thickness depending on the characteristics of the underlying patch antenna array. For example, the radii of the radomes over receive antenna arrays may be different than that for transmit antenna arrays. As described supra, the example PCB shown herein comprises two different antennas, transmit and receive. Each of the transmit and receive antennas radiates in a different pattern and has different gain and side lobes. These characteristics require a different radome for each antenna.

The example patch antenna array 116 used for simulation purposes is shown having three antenna elements or ports 118, namely ports 1 through 3, fabricated on PCB 110. The invention, however, can be used with patch antenna arrays having any number of ports or elements.

Similar to the radome for transmit antennas described supra, in one embodiment, the radome for receive antennas comprises a curved 'U' shape half cylinder having precise width and length, thickness, radius, and height above the PCB.

Note that the half cylinder shape contributes to equalizing the phase delay for each electromagnetic wave that radiates from the antenna and travels through the radome. Due to the half cylinder shaped geometry, the spherical shape of the radiated wave intersects with the surface of the radome in a substantially perpendicular angle. According to well-known electromagnetic theory, assuming that the wave is a plane wave at the area of intersecting, the scatter angle inside the radome is identical to the incident angle. Thus, the radiation pattern is substantially unaffected while passing through the radome.

Note that the thickness of the receive antenna radome is determined in accordance with, inter alia, the material, dielectric constant, and the frequency of the antenna. In one embodiment, one half wavelength (i.e. the relative wavelength) is selected which causes a standing wave to be created inside the radome which radiates outwards with maximum gain.

The receive antenna radome may be constructed of any suitable material such as a dielectric material. For example, the dielectric material may comprise thermoplastic polyetherimide based polymer, fiberglass, plastic, polytetrafluoroethylene (PTFE), PTFE coated fabric, and polyurethane. In one embodiment, Ultem 1000 resin is used to construct the radome.

In one embodiment, the thickness of the material forming the curved half cylinder shaped portion over the receive patch antenna array is $\lambda_r/2$ where $\lambda_r$ is the relative wavelength of the signal within the material. In one embodiment the thickness is approximately 1.1 mm which is also the approximate height above the PCB. The radius of curvature of the radome is approximately 8 mm. The minimum distance between the top receive antenna and the lid of the radome is approximately 20 mm. Note that the curved portion of the radome is not intended to act as a lens and thus it has no focal point.

Performance results of a receive patch antenna array with the radome of the present invention and no radome at all are presented infra. It is observed in the graphs shown that the radome of the present invention presents minimal distortion in gain and sidelobes in both azimuth and elevation.

Figure 27:
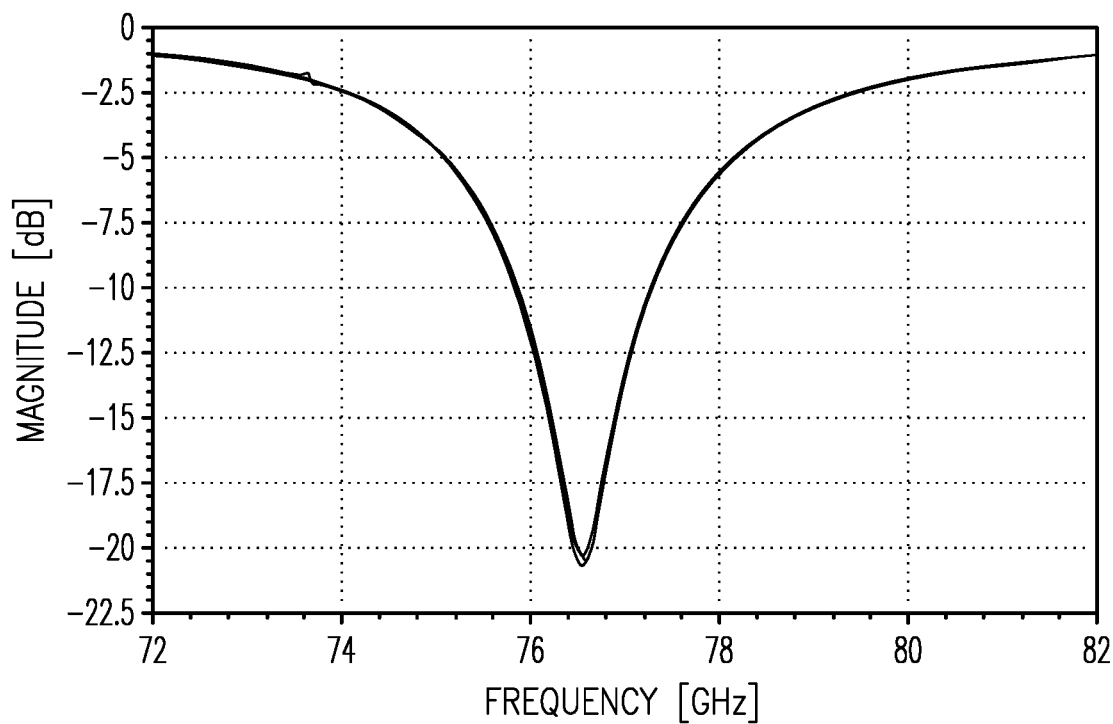
FIG. 27 is a diagram illustrating return loss graph for an example radome for a receive patch antenna array.

A diagram illustrating return loss graph for an example radome for a receive patch antenna array is shown in FIG. 27. In this graph, the return loss $S_{i,i}$ parameter is shown for ports 1 through 3. For most of the ports, the return loss is approximately −21 dB at 76.5 GHz.

Figure 28:
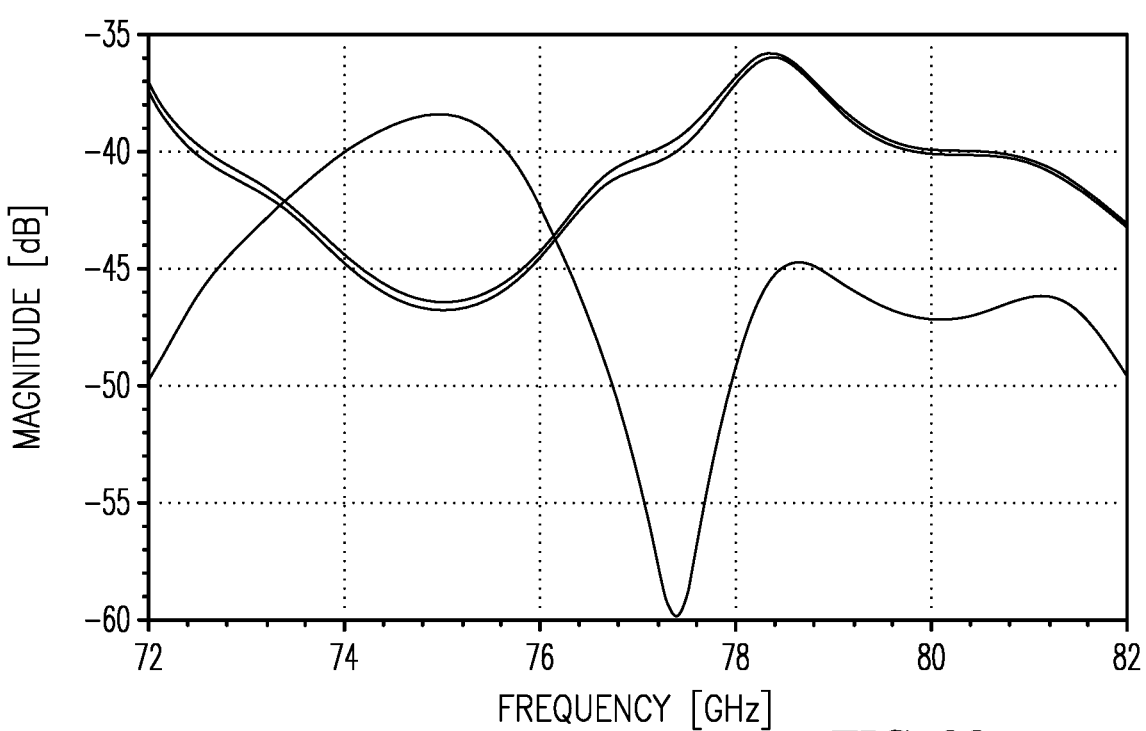
FIG. 28 is a diagram illustrating isolation graph for an example radome for a receive patch antenna array.

A diagram illustrating isolation graph for an example radome for a receive patch antenna array is shown in FIG. 28. In this graph, the isolation $S_{i,j}$ ($i \neq j$) is shown for ports 1 through 3. The isolation ranges between approximately −28 dB and −31 dB.

Figure 29:
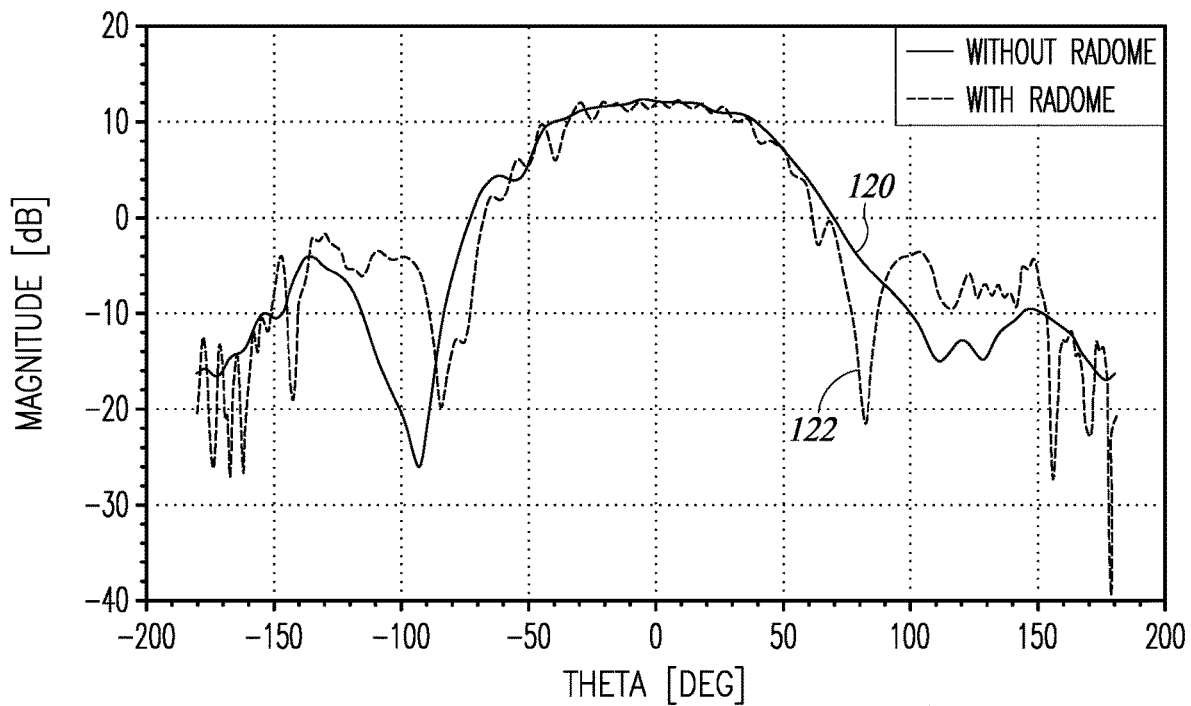
FIG. 29 is a diagram illustrating azimuth gain for port 1 of an example radome for a receive patch antenna array.

A diagram illustrating azimuth gain for port 1 of an example radome for a receive patch antenna array is shown in FIG. 29. In this graph, the azimuth gain for the port 1 signal is shown for both without the radome (i.e. reference gain) (trace 120) and with the radome of the present invention (trace 122). As shown, the gain with the radome substantially tracks the gain without the radome and barely impacts the field of view (±75 degrees) of the antenna element.

Figure 30:
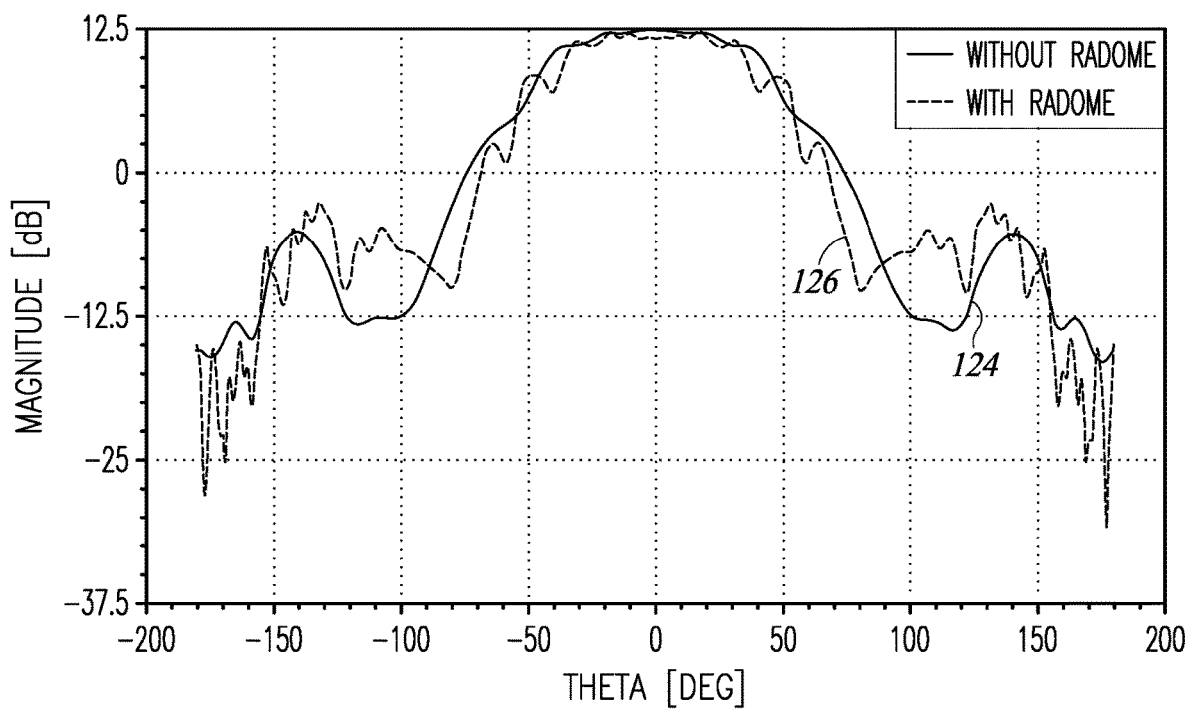
FIG. 30 is a diagram illustrating azimuth gain for port 2 of an example radome for a receive patch antenna array.

A diagram illustrating azimuth gain for port 2 of an example radome for a receive patch antenna array is shown in FIG. 30. In this graph, the azimuth gain for the port 2 signal is shown for both without the radome (i.e. reference gain) (trace 124) and with the radome of the present invention (trace 126). As shown, the gain with the radome substantially tracks the gain without the radome and barely impacts the field of view (±75 degrees) of the antenna element.

Figure 31:
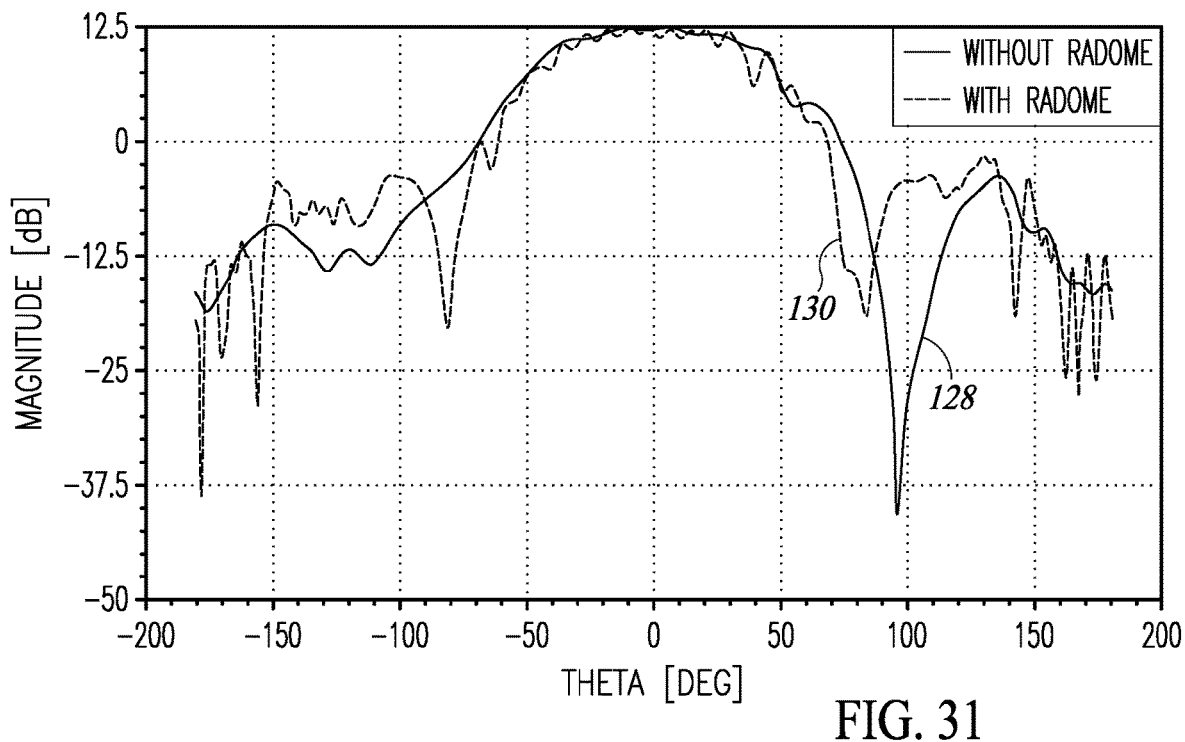
FIG. 31 is a diagram illustrating azimuth gain for port 3 of an example radome for a receive patch antenna array.

A diagram illustrating azimuth gain for port 3 of an example radome for a receive patch antenna array is shown in FIG. 31. In this graph, the azimuth gain for the port 3 signal is shown for both without the radome (i.e. reference gain) (trace 128) and with the radome of the present invention (trace 130). As shown, the gain with the radome substantially tracks the gain without the radome and barely impacts the field of view (±75 degrees) of the antenna element.

Figure 32:
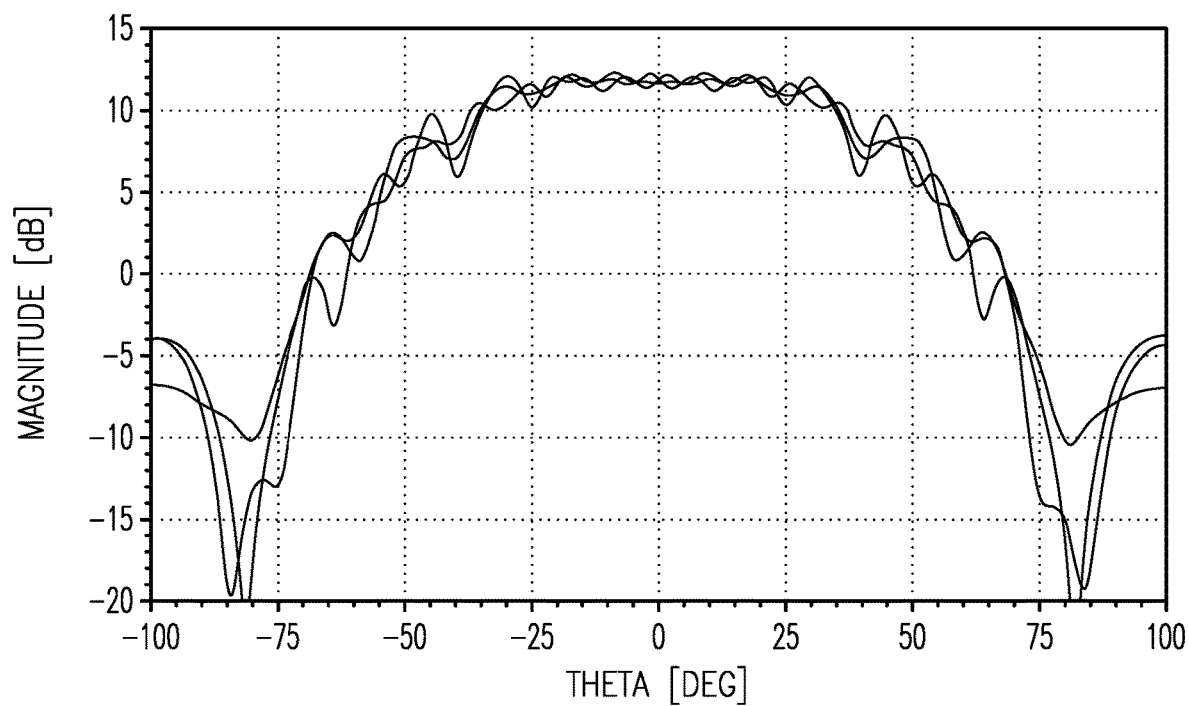
FIG. 32 is a diagram illustrating a comparison of azimuth gain of an example radome for a receive patch antenna array.

A diagram illustrating a comparison of azimuth gain of an example radome for a receive patch antenna array is shown in FIG. 32. In this graph, a comparison of the azimuth gains of ports 1, 2, and 3 are shown with the radome of the present invention. Note that the gain performance of the different ports track each other well between ±75 degree field of view.

Figure 33:
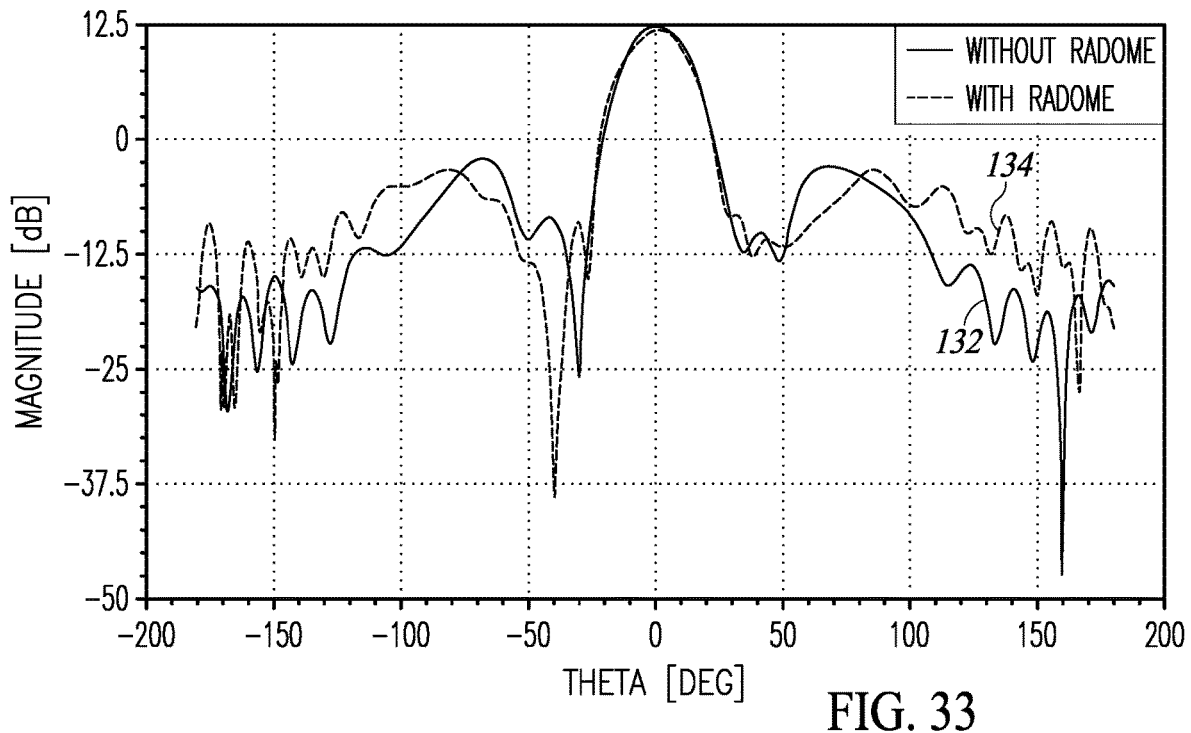
FIG. 33 is a diagram illustrating elevation gain for port 1 of an example radome for a receive patch antenna array.

A diagram illustrating elevation gain for port 1 of an example radome for a receive patch antenna array is shown in FIG. 33. In this graph, the elevation gain for the port 1 signal is shown for both without the radome (i.e. reference gain) (trace 132) and with the radome of the present invention (trace 134). As shown, the gain with the radome substantially tracks the gain without the radome and barely impacts the field of view (±25 degrees) of the antenna element.

Figure 34:
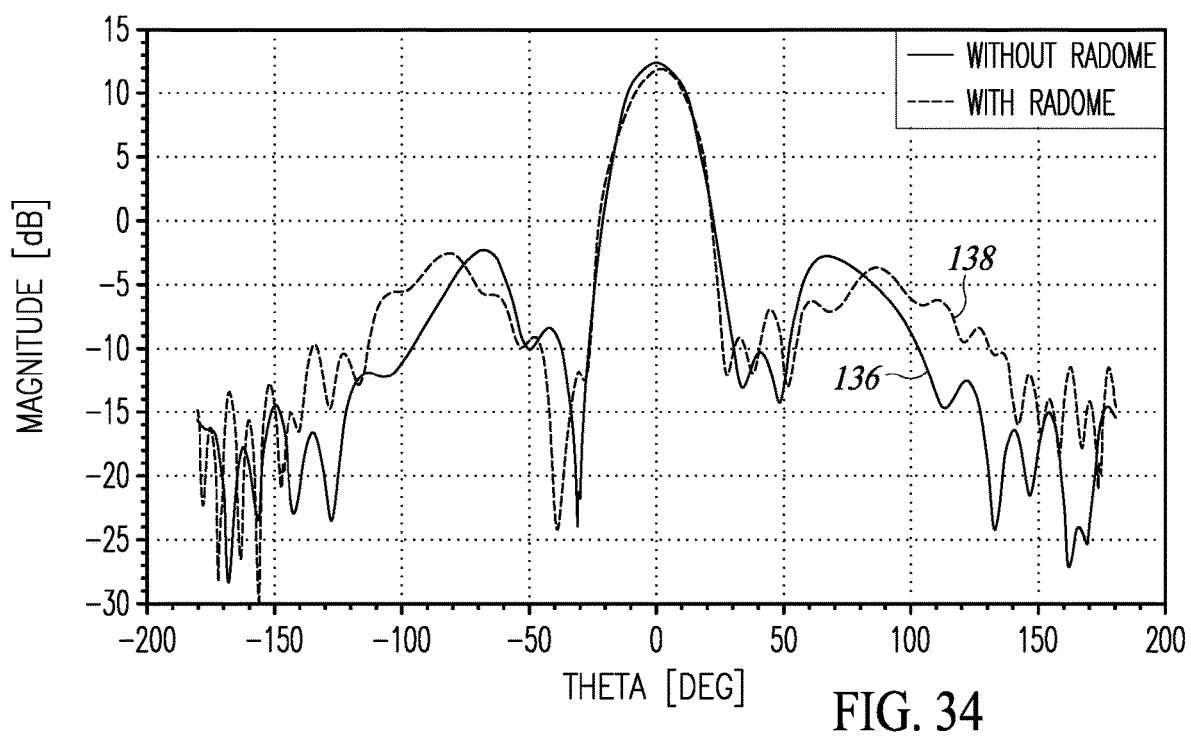
FIG. 34 is a diagram illustrating elevation gain for port 2 of an example radome for a receive patch antenna array.

A diagram illustrating elevation gain for port 2 of an example radome for a receive patch antenna array is shown in FIG. 34. In this graph, the elevation gain for the port 2 signal is shown for both without the radome (i.e. reference gain) (trace 136) and with the radome of the present invention (trace 138). As shown, the gain with the radome substantially tracks the gain without the radome and barely impacts the field of view (±25 degrees) of the antenna element.

Figure 35:
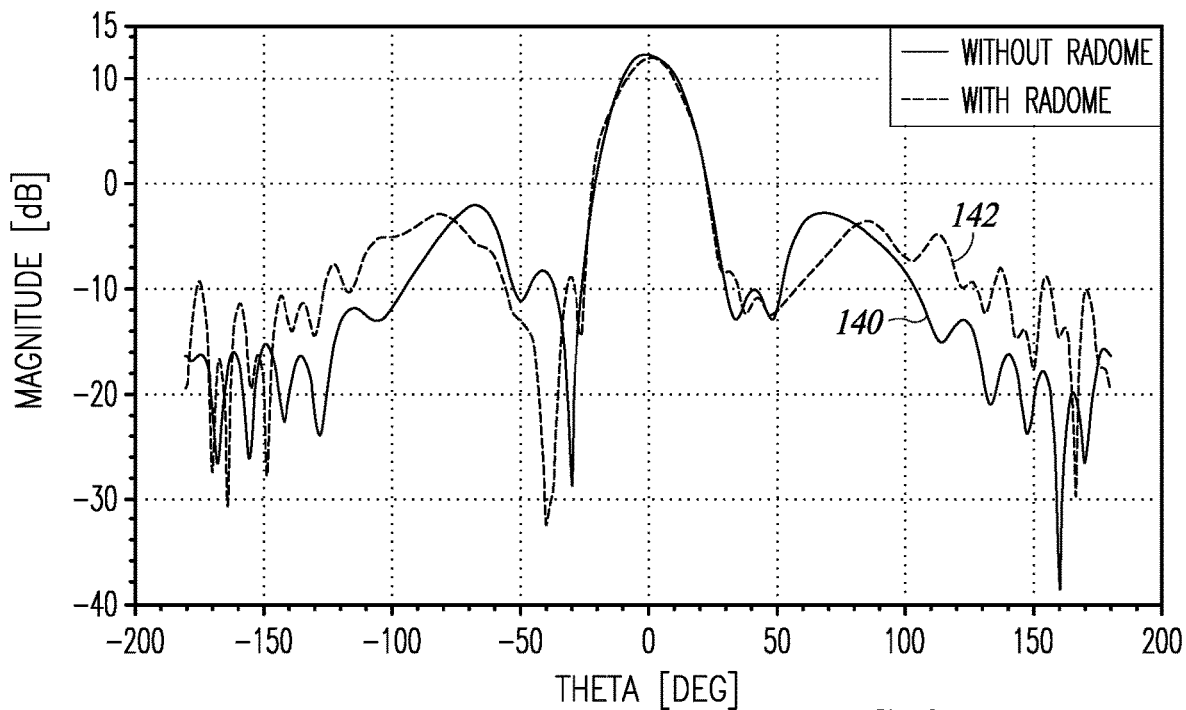
FIG. 35 is a diagram illustrating elevation gain for port 3 of an example radome for a receive patch antenna array.

A diagram illustrating elevation gain for port 3 of an example radome for a receive patch antenna array is shown in FIG. 35. In this graph, the elevation gain for the port 3 signal is shown for both without the radome (i.e. reference gain) (trace 140) and with the radome of the present invention (trace 142). As shown, the gain with the radome substantially tracks the gain without the radome and barely impacts the field of view (±25 degrees) of the antenna element.

Figure 36:
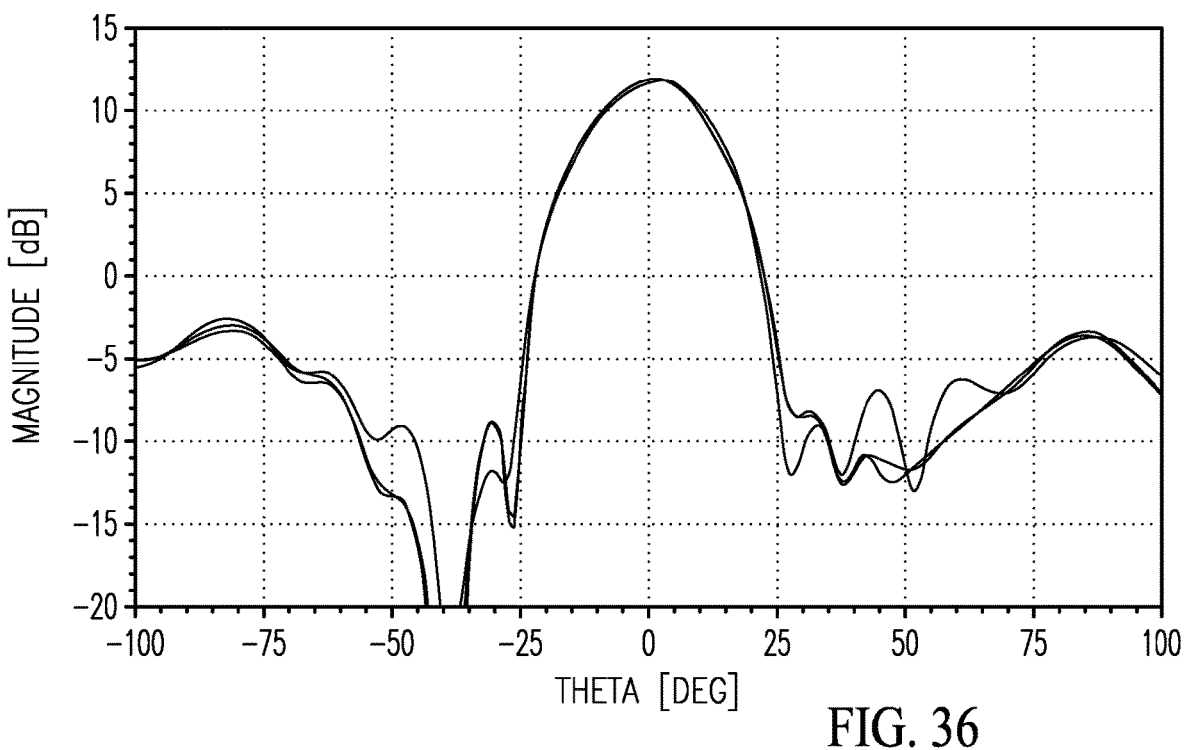
FIG. 36 is a diagram illustrating a comparison of elevation gain of an example radome for a receive patch antenna array.

A diagram illustrating a comparison of elevation gain of an example radome for a receive patch antenna array is shown in FIG. 36. In this graph, a comparison of the elevation gains of ports 1, 2, and 3 are shown with the radome of the present invention. Note that the gain performance of the different ports track each other well between ±25 degree field of view.

Figure 37:
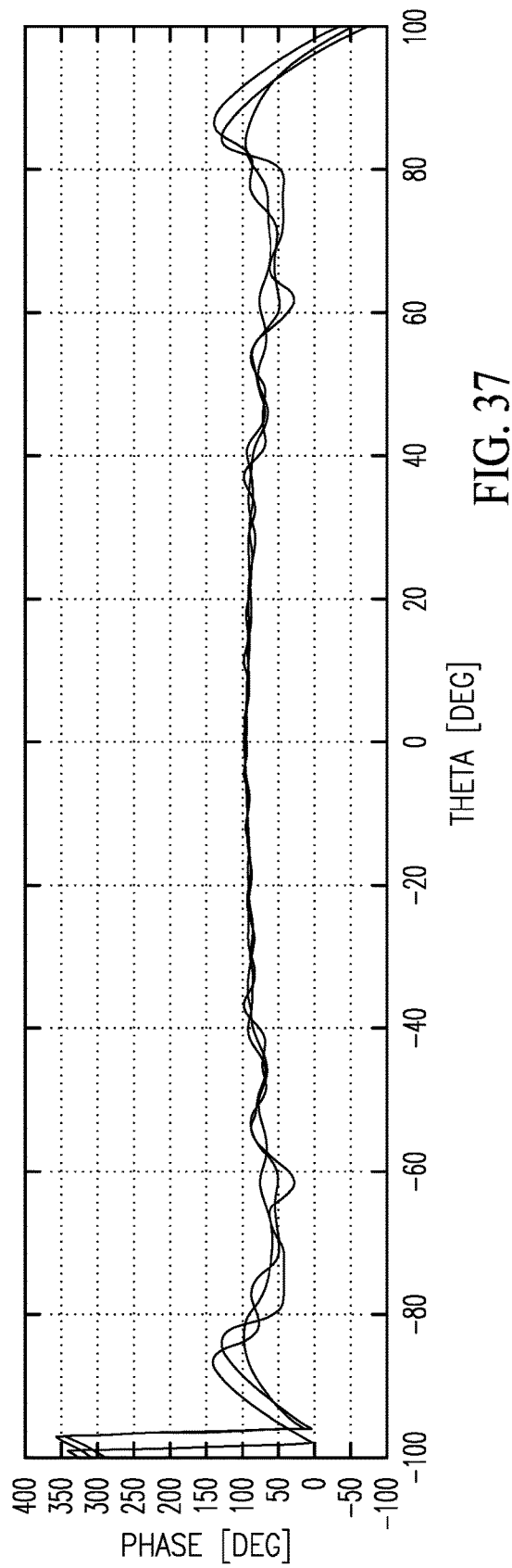
FIG. 37 is a diagram illustrating a comparison of azimuth phase of an example radome for a receive patch antenna array.

A diagram illustrating a comparison of azimuth phase of an example radome for a receive patch antenna array is shown in FIG. 37. In this graph, a comparison of the azimuth phase of ports 1, 2, and 3 are shown with the radome of the present invention. Note that the phase performance of the different ports track each other well between approximately ±80 degree field of view.

In an alternative embodiment, the half cylinder shaped radome that covers the entire patch antenna array is replaced with a plurality of half sphere shaped radomes. Each half sphere shaped radome is located over an individual antenna element or port in the array.

Figure 38A:
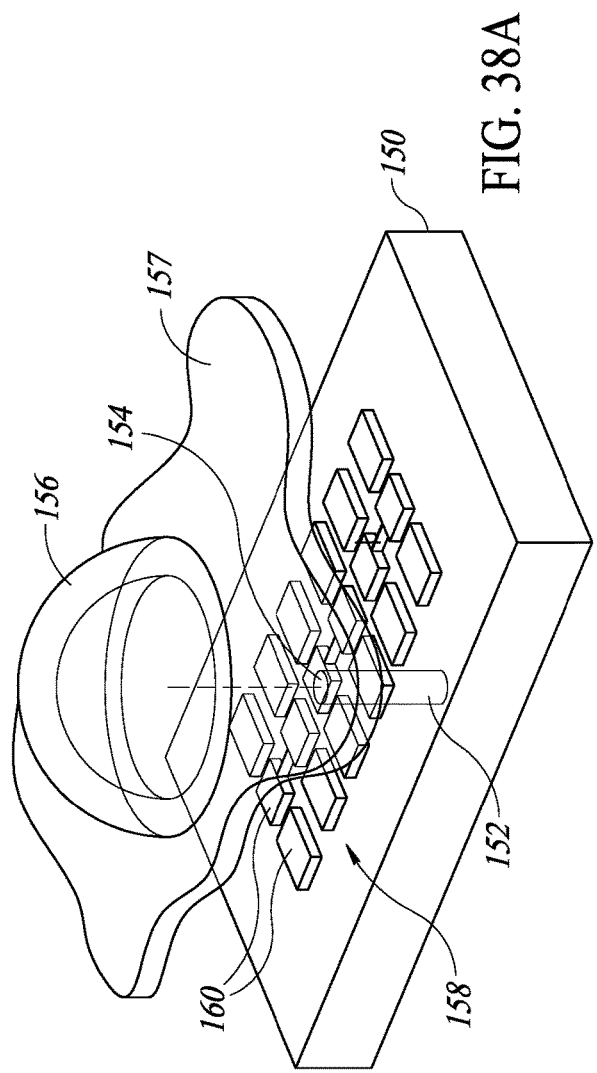
FIG. 38A is a diagram illustrating a perspective view of an example spherical shaped radome located over a patch antenna array.
Figure 38B:
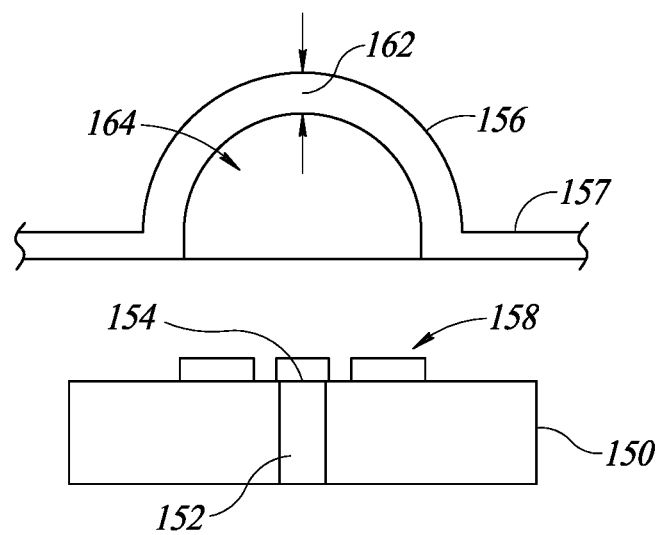
FIG. 38B is a diagram illustrating a side view of the example radome of FIG. 38A.
Figure 39:
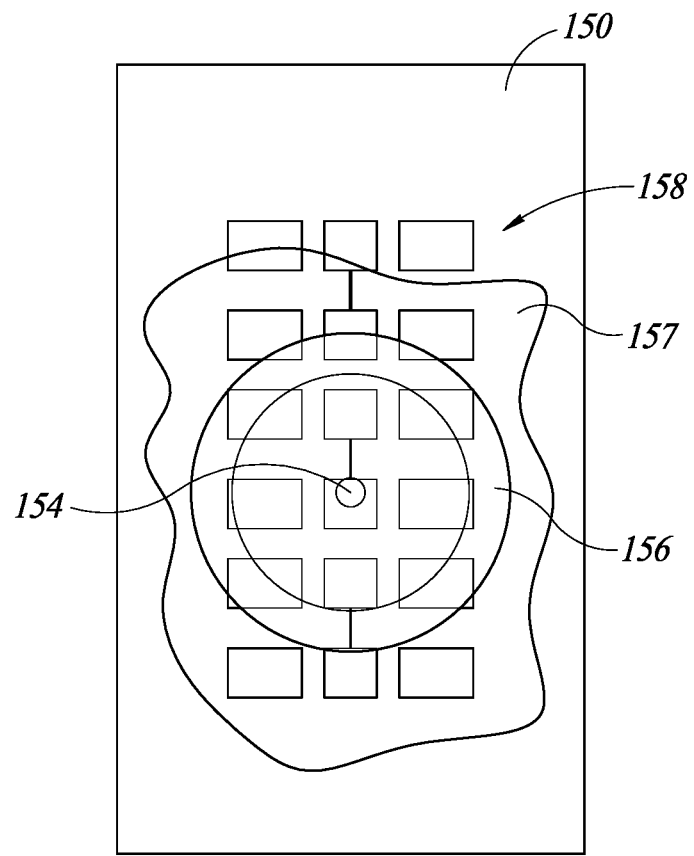
FIG. 39 is a diagram illustrating a top view of the example radome and patch antenna array of FIG. 38A.

A diagram illustrating a perspective view of an example spherical shaped radome located over a patch antenna array is shown in FIG. 38A. A diagram illustrating a side view of the example radome of FIG. 38A is shown in FIG. 38B. A diagram illustrating a top view of the example radome and patch antenna array of FIG. 38A is shown in FIG. 39. The half sphere (i.e. bubble) shaped radome 156 is shown in position over PCB 150 on which is fabricated patch antenna array 158 comprising a plurality of antenna patch elements 160 including antenna port 154. Other than the region of half spheres, the remainder of the radome 150 comprises a generally flat portion 157. Also shown is a high frequency via 152 that electrically connects the patch antennas on one side of the PCB 150 to circuit traces on the opposite side.

In one embodiment, the radome 156 comprises a convex hallowed out half sphere (i.e. bubble) shape that forms an internal cavity or void 164. It is positioned over the patch antenna port 154. Note that this example antenna has only a single port. It is appreciated that the radome may be used with antennas having any number of ports. The example radome disclosed herein is suitable for different patch antenna arrays located on the same plane printed on a PCB. The radome is constructed to have a certain thickness 162 that varies with the particular material of the radome and the frequency of the signal. The radius of curvature of the half spherical radome also varies depending on the implementation and physical layout of the patch antenna array. The half spherical radome located over each patch antenna array may have a different radius and thickness depending on the characteristics of the underlying antenna port. For example, the radii of the radomes over receive antenna ports may be different than that for transmit antenna ports.

Figure 40:
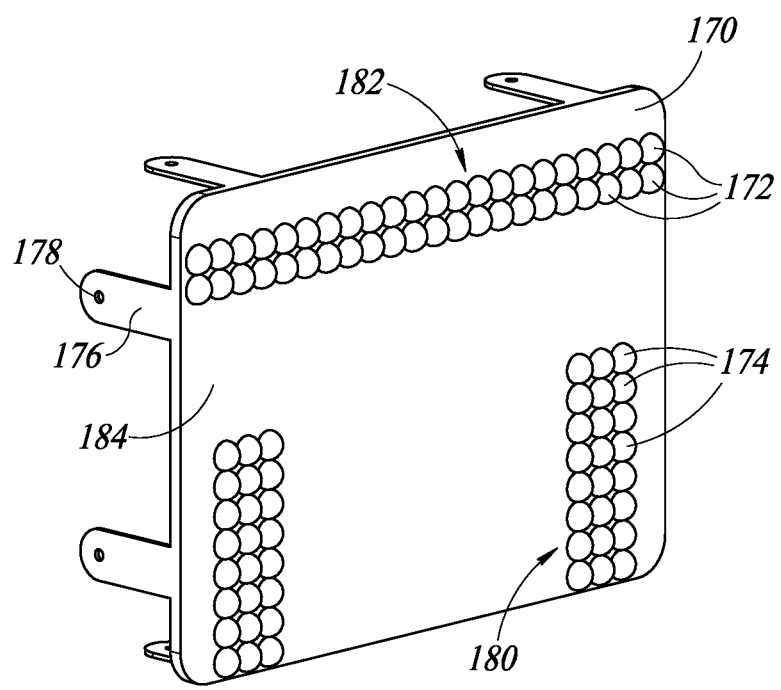
FIG. 40 is a diagram illustrating a perspective view an example radome for patch antenna arrays incorporating half sphere structures.

A diagram illustrating a perspective view an example radome for patch antenna arrays incorporating half sphere structures is shown in FIG. 40. The radome, generally referenced 170, comprises a generally flat portion 184, connection tables 176 with mounting holes 178, an array 182 of half spheres 172 configured to lie over the receive patch antenna array, and an array 180 of half spheres 174 configured to lie over the left and right transmit patch antenna arrays.

Similar to the half cylinder shaped radome described supra, the half spherical radome may be constructed of any suitable material such as a dielectric material. The dielectric material may comprise thermoplastic polyetherimide based polymer, fiberglass, plastic, polytetrafluoroethylene (PTFE), PTFE coated fabric, and polyurethane.

In one embodiment, the thickness of the material forming the curved half sphere shaped portion over the antenna port is $\lambda_r/2$ where $\lambda_r$ is the relative wavelength of the signal within the material. Note that the curved portion of the radome is not intended to act as a lens and thus it has no focal point.

It is noted that the performance of the half sphere shaped radome is likely to exceed that of the half cylinder shaped radome described supra. This is due to the fact that the curvature of the half sphere shaped radome is in two dimensions whereas in the half cylinder shaped radome it is only in one dimension. In effect, the half sphere shaped radome is the optimal case of the half cylinder shaped radome. In this case, rather than 'sharing' the radome along the long axis of the path antenna array, in the half sphere shaped radome embodiment, each antenna port has its own individual half sphere radome which functions to improve the performance.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A radome for use with an automotive radar antenna, comprising:
   a cover configured to cover a printed circuit board (PCB) on which a plurality of radiating element arrays are formed, including at least one transmit radiating element array and at least one receive radiating element array;
   said cover comprising a first substantially hallow half cylinder portion located over said at least one transmit radiating element array;
   said cover comprising a second substantially hallow half cylinder portion located over said at least one receive radiating element array; and
   wherein said first substantially hallow half cylinder portion and said second substantially hallow half cylinder portion are configured such that electromagnetic waves radiating from said at least one transmit radiating element array and said at least one receive radiating element array, respectively, are incident thereon at a substantially perpendicular angle.

2. The radome according to claim 1, wherein said first substantially hallow half cylinder portion and said second substantially hallow half cylinder portion comprise a dielectric material selected from a group consisting of thermoplastic polyetherimide based polymer, fiberglass, plastic, polytetrafluoroethylene (PTFE), PTFE coated fabric, and polyurethane.

3. The radome according to claim 1, wherein said first substantially hallow half cylinder portion and said second substantially hallow half cylinder portion have a thickness of approximately one half relative wavelength.

4. The radome according to claim 1, wherein said first substantially hallow half cylinder portion and said second substantially hallow half cylinder portion are configured such that phase delay for electromagnetic waves radiating from said at least one transmit radiating element array and said at least one receive radiating element array therethrough, respectively, are substantially equal.

5. The radome according to claim 1, wherein said first substantially hallow half cylinder portion and said second substantially hallow half cylinder portion have the same radius of curvature.

6. The radome according to claim 1, wherein said first substantially hallow half cylinder portion and said second substantially hallow half cylinder portion have different radii of curvature.

7. The radome according to claim 1, wherein said first substantially hallow half cylinder portion and said second substantially hallow half cylinder portion are configured at a first particular height and a second particular height, respectively, above said PCB.

8. An automotive vehicle radar antenna, comprising:
   a housing mountable on an automotive vehicle and having an interior, said housing configured to secure within said interior a printed circuit board (PCB) on which a plurality of radiating element arrays are formed, including at least one transmit radiating element array and at least one receive radiating element array;
   a radome configured to cover and enclose said PCB;
   said radome comprising a first substantially hallow half cylinder portion located over said at least one transmit radiating element array;
   said radome comprising a second substantially hallow half cylinder portion located over said at least one receive radiating element array; and
   wherein said first substantially hallow half cylinder portion and said second substantially hallow half cylinder portion are configured such that electromagnetic waves radiating from said at least one transmit radiating element array and said at least one receive radiating element array, respectively, are incident thereon at a substantially perpendicular angle.

9. The radar antenna according to claim 8, where said radome further comprises a plurality of fins extending from a surface thereof, said plurality of fins configured to secure said radome to said housing.

10. The radar antenna according to claim 9, where said fins are configured to snap-fit to said housing.

11. The radar antenna according to claim 9, where said fins are configured to be fastened to said housing via screws.

12. The radar antenna according to claim 8, wherein said first substantially hallow half cylinder portion and said second substantially hallow half cylinder portion comprise a dielectric material selected from a group consisting of thermoplastic polyetherimide based polymer, fiberglass, plastic, polytetrafluoroethylene (PTFE), PTFE coated fabric, and polyurethane.

13. The radar antenna according to claim 8, wherein said first substantially hallow half cylinder portion and said second substantially hallow half cylinder portion have a thickness of approximately one half relative wavelength.

14. The radar antenna according to claim 8, wherein said first substantially hallow half cylinder portion and said second substantially hallow half cylinder portion are configured such that phase delay for electromagnetic waves radiating from said at least one transmit radiating element array and said at least one receive radiating element array therethrough, respectively, are substantially equal.

15. The radar antenna according to claim 8, wherein said first substantially hallow half cylinder portion and said second substantially hallow half cylinder portion have different radius of curvature.

* * * * *